United States Patent
Bhagchandani et al.

(10) Patent No.: US 11,614,983 B2
(45) Date of Patent: Mar. 28, 2023

(54) FORECASTING FAILURES OF INTERCHANGEABLE PARTS

(71) Applicant: ACCENTURE GLOBAL SOLUTIONS LIMITED, Dublin (IE)

(72) Inventors: Hitesh Bhagchandani, Bangalore (IN); Rajarajan Thangavel Ramalingam, Bangalore (IN); Basavaraj Chidanandappa, Koppal (IN); Sriharsha Sravan Karavadi, Hyderabad (IN); Manish Kumar, Navi Mumbai (IN); Amartya Ray, Mumbai (IN); Zakir Hussain, Kurnool (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 561 days.

(21) Appl. No.: 16/673,371

(22) Filed: Nov. 4, 2019

(65) Prior Publication Data
US 2021/0133010 A1 May 6, 2021

(51) Int. Cl.
*G06F 11/00* (2006.01)
*G06F 30/23* (2020.01)

(52) U.S. Cl.
CPC ............ *G06F 11/008* (2013.01); *G06F 30/23* (2020.01)

(58) Field of Classification Search
None
See application file for complete search history.

(56) References Cited

U.S. PATENT DOCUMENTS

| | | | |
|---|---|---|---|
| 2007/0124009 A1* | 5/2007 | Bradley | G06Q 10/087 700/99 |
| 2007/0294149 A1* | 12/2007 | Lu | G06F 16/951 705/28 |
| 2017/0372237 A1* | 12/2017 | Leao | G06Q 10/067 |

OTHER PUBLICATIONS

D. G. Rajpathak and S. Singh, "An Ontology-Based Text Mining Method to Develop D-Matrix From Unstructured Text," in IEEE Transactions on Systems, Man, and Cybernetics: Systems, vol. 44, No. 7, pp. 966-977, Jul. 2014, doi: 10.1109/TSMC.2013.2281963. (Year: 2014).*

* cited by examiner

*Primary Examiner* — Matthew G Marini
(74) *Attorney, Agent, or Firm* — Mannava & Kang, P.C.

(57) ABSTRACT

A material failure forecasting system accesses historical failure data to forecasts future failures. The failure data of a material is analyzed using text processing techniques to identify failures and suspensions. The text processing techniques provide for identifying failures when fault words are associated with negations. A fault ontology establishes different failure modes that include primary, secondary and tertiary levels which enable identifying a sequence of failures. The failures thus identified are fitted to a data distribution selected from a plurality of data distributions. The parameters from the data distribution are used for simulating a demand profile for the material which considers interchangeability. Similarly failure data of the materials in an equipment can be analyzed and the reliability of the equipment can be estimated.

16 Claims, 16 Drawing Sheets

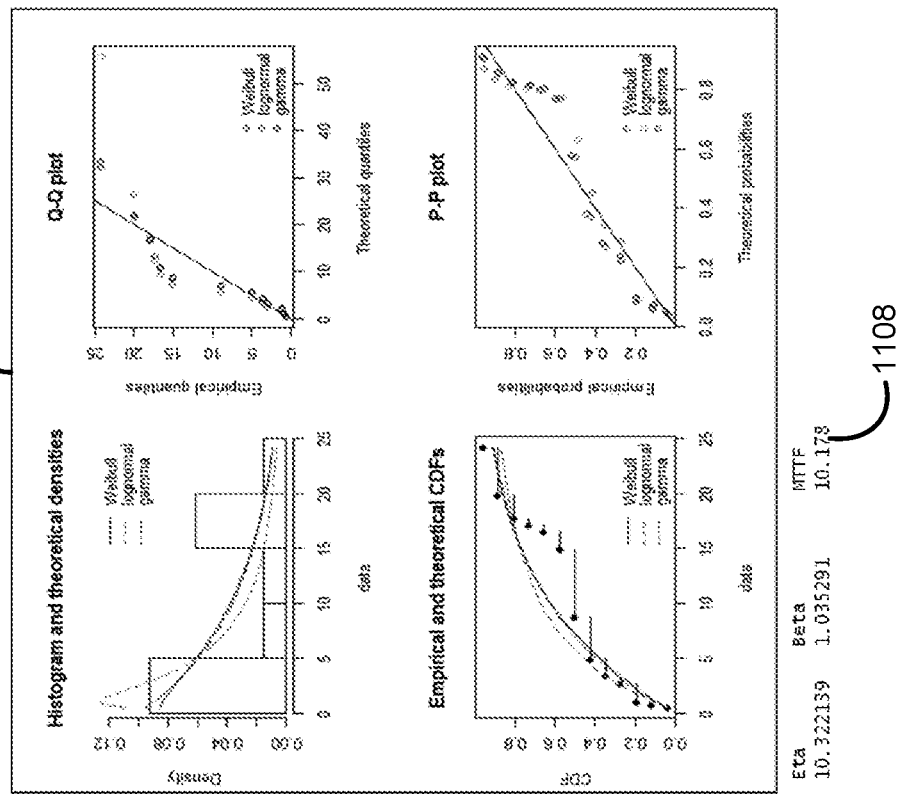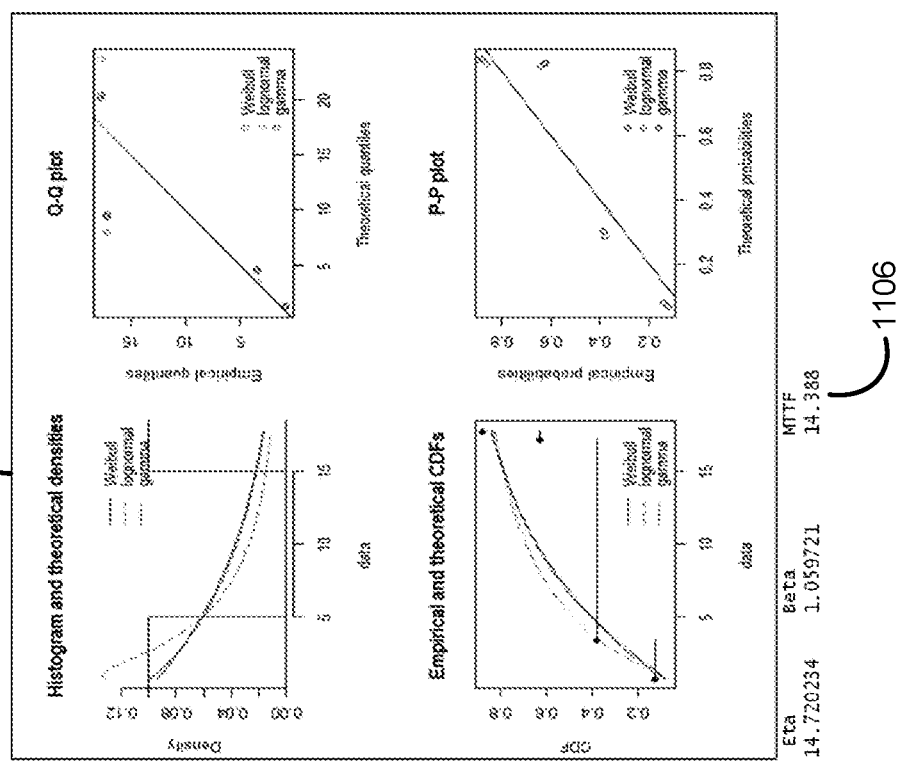
FIG. 11

FIG. 12

1202 / 1204 — Simulation 1

| Current Max / Max for this Simulation | Gasket 10 | Sleeve 13 | Gauge 9 | U-Cup 11 | Equipment Availability (1 or 0) |
|---|---|---|---|---|---|
|  | 1 | 1 | 1 | 1 |  |
| Month 1 |  |  |  |  | 1 |
| Month 2 |  |  |  |  | 1 |
| Month 3 |  |  |  |  | 1 |
| Month 4 |  |  |  | 4 | 0 |
| Month 5 |  | 3 |  |  | 0 |
| Month 6 | 2 |  |  |  | 0 |
| Month 7 |  |  |  |  | 1 |
| Month 8 |  |  | 1 | 4 | 0 |
| Month 9 |  |  |  |  | 0 |
| Month 10 |  | 3 |  |  | 0 |
| Month 11 |  |  |  |  | 1 |
| Month 12 | 2 |  |  | 4 | 0 |
| Month 13 |  |  | 1 |  | 1 |
| Month 14 |  |  |  |  | 1 |
| Month 15 |  | 3 |  |  | 0 |
| Month 16 |  |  | 1 | 4 | 0 |
| Month 17 |  |  |  |  | 1 |
| Month 18 | 2 |  |  |  | 0 |
| Month 19 |  |  | 1 |  | 1 |
| Month 20 |  | 3 |  | 4 | 0 |
| Month 21 |  |  |  |  | 1 |
| Month 22 |  |  | 1 |  | 1 |
| Month 23 |  |  |  |  | 1 |
| Month 24 | 2 |  |  | 4 | 0 |
| Availability for Simulation 1 |  |  |  |  | 46% |

Demand for material based on reliability calculations in previous stage

1206 — Simulation 1 (with Pump and Turbine availability)

| Current Max / Max for this Simulation | Gasket 10 | Sleeve 13 | Gauge 9 | U-Cup 11 | Equipment Availability Pump (1 or 0) | Equipment Availability Turbine (1 or 0) |
|---|---|---|---|---|---|---|
|  | 1 | 1 | 1 | 1 |  |  |
| Month 1 |  |  |  |  | 1 | 1 |
| Month 2 |  |  |  |  | 1 | 1 |
| Month 3 |  |  |  |  | 1 | 0 |
| Month 4 |  |  |  | 4 | 0 | 0 |
| Month 5 |  | 3 |  |  | 0 | 0 |
| Month 6 | 2 |  |  |  | 0 | 0 |
| Month 7 |  |  |  |  | 1 | 1 |
| Month 8 |  |  | 1 | 4 | 0 | 0 |
| Month 9 |  |  |  |  | 0 | 0 |
| Month 10 |  | 3 |  |  | 0 | 1 |
| Month 11 |  |  |  |  | 1 | 0 |
| Month 12 | 2 |  |  | 4 | 0 | 1 |
| Month 13 |  |  | 1 |  | 1 | 1 |
| Month 14 |  |  |  |  | 1 | 0 |
| Month 15 |  | 3 |  |  | 0 | 0 |
| Month 16 |  |  | 1 | 4 | 0 | 1 |
| Month 17 |  |  |  |  | 1 | 0 |
| Month 18 | 2 |  |  |  | 0 | 0 |
| Month 19 |  |  | 1 |  | 1 | 1 |
| Month 20 |  | 3 |  | 4 | 0 | 1 |
| Month 21 |  |  |  |  | 1 | 0 |
| Month 22 |  |  | 1 |  | 1 | 1 |
| Month 23 |  |  |  |  | 1 | 1 |
| Month 24 | 2 |  |  | 4 | 0 | 0 |
| Availability for Simulation 1 |  |  |  |  | 46% | 38% |

Demand for material based on reliability calculations in previous stage

1208

FORECASTING FAILURES OF INTERCHANGEABLE PARTS

BACKGROUND

Rapid industrial growth of the last few centuries coupled with the expansion of high technology equipment, has resulted in having to maximize utility of equipment. The productivity of machines is adversely affected due to when certain parts of the machines malfunction due to routine wear and tear or other reasons such as accidents, handling by workers, etc. Sound spare parts management improves productivity by reducing idle machine time and increasing resource utilization. To prevent production loss due to sudden equipment failures, high spare parts inventory levels are carried for several years. Spare parts or materials provisioning is a complex technical problem that requires accurate analysis of the conditions and factors that affect the selection of appropriate provisioning models.

BRIEF DESCRIPTION OF DRAWINGS

Features of the present disclosure are illustrated by way of examples shown in the following figures. In the following figures, like numerals indicate like elements, in which:

FIG. 11 shows the various data distributions that are generated for the failure data in accordance with the examples disclosed herein.

FIG. 12 shows the demand profiles that are simulated from parameters of the best fit distribution in accordance with the examples disclosed herein.

DETAILED DESCRIPTION

Figure 1:
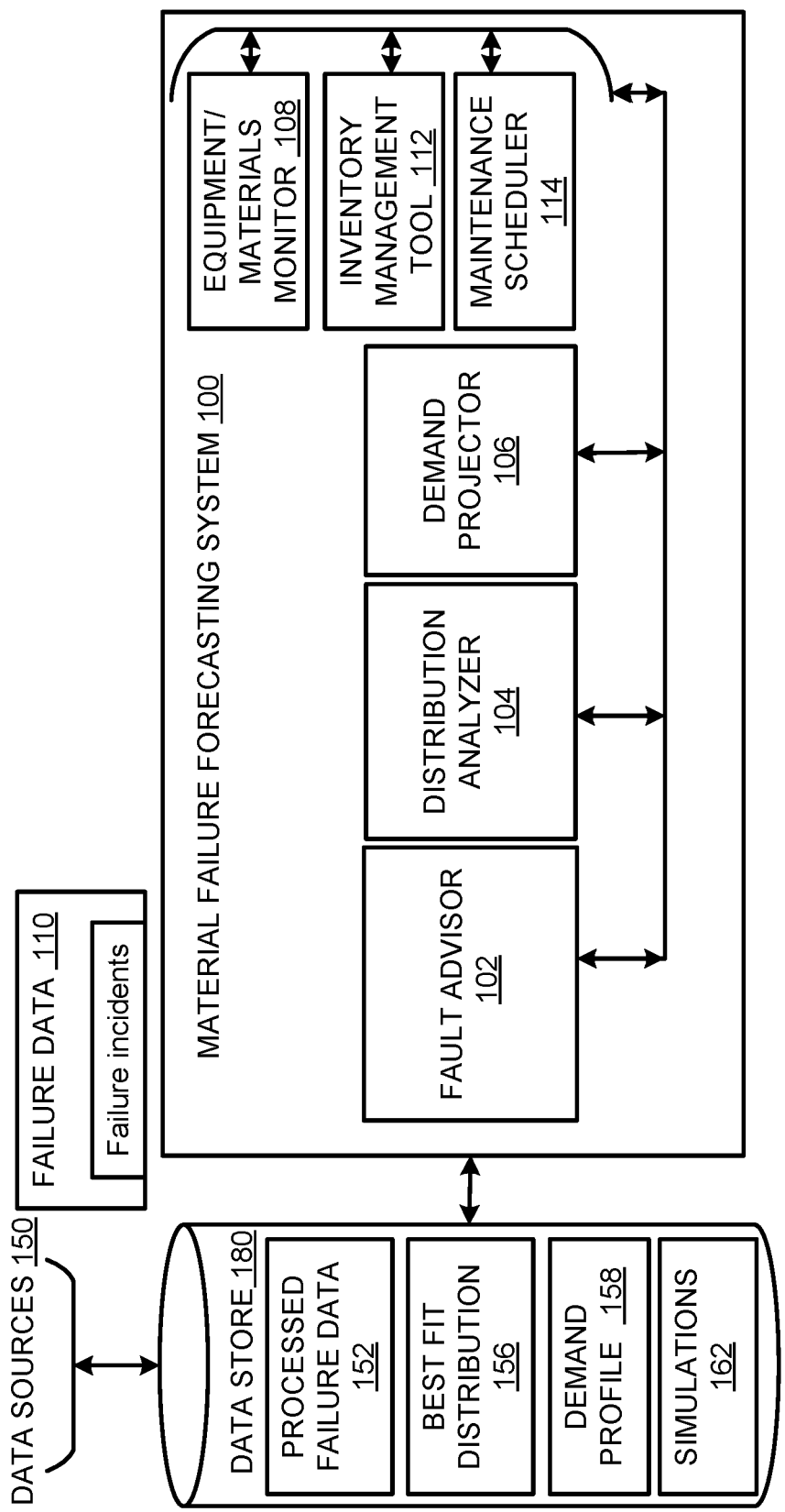
FIG. 1 is a block diagram of a material failure forecasting system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A material failure forecasting system that accesses historical failure data of a material and provides forecasts for future failures of the material is disclosed. The failure forecasting system accesses a plurality of data sources which may be associated with a factory or other manufacturing facility where a variety of equipment or machinery is operated. The plurality of data sources can include maintenance and material data, equipment data or other external data sources such as manufacturer provided failure rates, working conditions of the equipment, etc. Textual processing techniques are applied to the failure data thus collected in order to identify faults which can include actual failures and suspensions or probable failures. In addition, values such as time to failure (TTF) are also obtained from the failure data using for example, historical installation dates of the material and the failure dates. The TTF values are processed to identify one of a plurality of data distributions that best fits the failure data. The parameters from the data distribution associated with the best fit are calculated. A demand profile of the material for the equipment is simulated using the parameters from the best fit distributions. The demand profile can be used for various applications such as enabling inventory optimization, determining maintenance schedules, and the like.

The details of incidents of the failures and suspensions are extracted from the failure data via applying textual processing techniques that include but are not limited to parsing, tokenization, and parts of speech (POS) tagging. In addition, stemming is also applied to the tokens tagged with the POS data to extract root keywords. In an example, the failures may be indicated via phrases expressing negative sentiments wherein a noun or an adjective can be combined with a negation. A fault ontology is searched in order to identify the keywords. The fault ontology includes list of faults wherein each fault is described in terms of a plurality of levels. Each level in turn includes multiple words. A fault or failure can be identified from the fault ontology based on identification of word combinations from the different levels under the fault. If one or more of the keywords cannot be identified from the fault ontology, an online dictionary can be employed to identify the synonyms of the keywords. The synonyms can be used to identify faults from the fault ontology. In addition, each failure or suspension of the material or the machinery/equipment including the material can be characterized in terms of a sequence of failure incidents. Accordingly, the fault ontology defines different failure modes which include a primary failure mode, a secondary failure mode and a tertiary failure mode.

Upon identifying the failures and suspensions accurately, the failure forecasting system extracts the details of the failure incidents such as but not limited to, a malfunction date of the material included within an equipment, a type of failure, and the TTF. The TTF can be obtained from the failure data via identifying historical installation dates and failure dates. The data distribution pertaining to TTF is fitted into one of a plurality of data distributions such as but not limited to Weibull, Log-Normal, Exponential and Gamma data distributions. In an example, the TTF data can be fed to a R-engine or R-based code module in order to identify the best fit distribution. The parameters from the best fit data distribution are calculated. The parameters can include eta (η) or the scale parameter and the beta (ß) or the shape/slope parameter.

The parameters in turn are used to build a demand profile for the material for a given equipment. The demand profile can provide an estimation of a future probability of failure of the material in the given equipment. In an example, the material can be used in multiple equipment. A combined demand profile of the material across all the multiple equipment pieces can be built by aggregating the best fit distribution of the failure data of the material for each equipment piece of the multiple equipment pieces. In an example, Monte Carlo method can be employed to simulate the demand profile of the material across multiple equipment. Based on the demand profile across the multiple equipment, the availability of each of the multiple equipment pieces can be obtained wherein the availability of an equipment is indicative of an operations status of that equipment. Similarly, the availability or reliability of an equipment can depend on the aggregation of demand profiles of the multiple parts or materials that constitute the equipment.

In an example, the demand profile of a particular material can be used to determine or forecast the future failures of the material in a given equipment. In an example, simulations of equipment availability can be generated by varying the minimum and maximum levels of the material by a unit quantity. The equipment availability is measured at each step. As the equipment availability improves the minimum and maximum values of the material in the inventory can be varied. However, it is noted that after a certain point, increasing the number/quantity of the material does not result in the corresponding improvement in the availability of the equipment, at which point, the optimized minimum and maximum inventory for the material is identified. Similarly, maintenance scheduling can also be planned based on the projected failure dates of the equipment and/or material.

The material failure forecasting system provides for improving reliability of machines/equipment by forecasting failures of the component materials of the equipment based on historical failure data. Equipment failures are difficult to predict in advance. In order to prevent machine breakdown or unavailability, high inventory levels of materials or parts up to several years may be carried in the inventories. Existing distributions do not adequately model failures and suspensions. The standard distribution fit algorithms currently available do not take into account the effect of suspensions in calculating parameters. Weibull, Log-Normal, Gamma, and Exponential distributions approximate all failure events as failures and do not distinguish between an actual failure and a suspension. The failure forecasting system is configured to more accurately predict the material/machine failures as the suspensions or probable failures pertaining to scheduled maintenance are also extracted from the failure data in addition to actual failure incidents.

Moreover, the failure forecasting system is configured for testing a plurality of data distributions for fitting the failure data. As a result, a more accurate fit of the failure data is possible as compared to fitting the failure data to a single data distribution. Also, inventories are normally stocked by applying the same strategies to spare parts that are applied to other materials. However, the interchangeability of a material is considered when generating a demand profile corresponding to the material by the failure forecasting system. The demand profile which is simulated by the failure forecasting system indicates the requirement for the material across the multiple equipment pieces that include the material. The improved computing device which runs the failure forecasting system disclosed herein generates demand profiles using Monte Carlo simulations and/or iterative simulations of stock levels thereby linking the inventory requirement to the failure probability. As a result, the computing device with the failure forecasting system can identify the optimal maximum and minimum inventory levels for a given material thereby finding failure patterns and frequencies by leveraging advanced analytics.

FIG. 1 is a block diagram of the material failure forecasting system 100 in accordance with the examples disclosed herein. The failure forecasting system 100 receives failure data 110 regarding performance of a material or an item such as a part of a machine and predicts future demand for the material based on the failure data 110. The failure forecasting system 100 includes a fault advisor 102, a distribution analyzer 104, a demand projector 106, an equipment/materials monitor 108, an inventory management tool 112 and a maintenance scheduler 114. The failure data 110 is received as a plurality of data inputs from various data sources within an industrial plant management system, e.g., Systems, Applications and Products (SAP). The data sources 150 can include notification data or automatic notifications generated by the plant machinery or manual notifications exchanged between users via emails, text messages, chats, etc., The data sources 150 can include maintenance and equipment data such as sensor data from the plant, bill of materials supplemented with historical work order data, equipment install base for both active and dismantled equipment, process maps and connections between equipment and spares, equipment run/cycle time. For example, when using SAP, database tables such as work order services and materials, work order long text, work order operations data, etc., can be used as the data sources for the failure forecasting system 100. Other data sources can include OEM/manufacturer provided failure rates, expected material life, design conditions, working conditions for the equipment such as temperature, humidity, etc. In addition, historical or archived data such as prior calculations of failure rates, mean time between failures, other maintenance metrics such as historical issuances and receipts of materials including service levels, lead times, etc., are also part of the data sources from which the failure data 110 is collected.

The failure data 110 is received in textual format which is processed in accordance with the examples disclosed herein by the fault advisor 102 to extract details regarding incidents of failures and likely failures or suspensions associated with a material. The material can include an item or a part that is included in one or more pieces of equipment. If the material is included in multiple pieces of equipment, then the failure data 110 can include details regarding failure or suspension incidents from the multiple equipment pieces. The failure data 110 thus gathered can be stored in a data store 180 and retrieved by the fault advisor 102 for further processing. Using various textual processing techniques, the failure data 110 is mined for identifying failures and suspensions along with the attributes such as the date of failure/suspension, the identity of the equipment piece experiencing the failure/suspension and the type or category of failure/suspension. It can be appreciated that although certain examples herein may be discussed with respect to either failures or suspensions, the examples are applicable to both failures and suspensions unless otherwise stated.

The type or category of failures can include specific terms associated with the particular material. In an example, the terminology can include negations which may or may not be indicative of failures. For example, a term such as 'no leak' is not indicative of a failure however, a term such as 'not tight' may be indicative of failure. Various textual processing techniques are adopted by the fault advisor 102 as detailed herein in order to identify failures or faults from not only predetermined fault/fault words or phrases but also from phrases combining the fault words with negations. In some examples, the failure data 110 may include details regarding a series of failures or suspensions that culminate in a final failure incident resulting in a breakdown of a piece of equipment. The fault advisor 102 can also be configured to identify the sequence of failure incidents leading to the final failure incident. In an example, the fault advisor 102 can be configured to calculate the time to failure (TTF) for a given material.

Processed failure data 152 is thus obtained on processing the failure data 110 by the fault advisor 102. The processed failure data 152 can include the various attributes of failure incidents including the TTF. The processed failure data 152 is accessed by the distribution analyzer 104 to identify a data distribution that best suits the failure patterns including failures and suspensions of the material. The distribution analyzer 104 executes a distribution fit analysis process to select one of a plurality of data distributions that best fits the failure data set of the material. Various tests or criteria are applied to the processed failure data 152 to identify the best fit distribution 156 and the parameters associated with the best fit curve are calculated.

Parameters from the best fit distribution 156 can then be used by the demand projector 106 to build a demand profile 158 for the material. The demand profile 158 enables estimating future demand for the material across all the pieces of equipment where the material is used. It can be appreciated that the future demand for the material arises when there is a failure, consequently, the demand profile 158 for the material for a given piece of equipment indicates a future failure of the equipment piece. Generation of demand profiles by the demand projector 106 requires various simulations 162 for different failure scenarios for a piece of equipment. Each of the failure scenarios can correspond to failures in one or more of the various materials or parts that constitute the piece of equipment. In an example, the demand projector 106 can be configured to consider interchangeability. When considering interchangeability, the failure scenarios can similarly be simulated for the materials that each of the multiple equipment pieces may have in common. The simulations 162 provide a cumulative availability indicator for each equipment piece. The cumulative availability indicator indicates future availability of a given piece of equipment by aggregating over a specific time period, the failure data of multiple materials included in the equipment piece which are also included in other equipment. For example, the availability indicator for each piece of machinery or equipment can be calculated on a weekly, fortnightly or monthly basis so that the availability or unavailability i.e., suspension of the equipment piece for an upcoming week, fortnight or month can be determined.

The simulations 162 that provide the availability/unavailability schedules for the machinery are used by applications for executing various automatic tasks. One such application includes the equipment/materials monitor 108 which can provide graphical user interfaces (GUIs) displaying the outputs from the various parts of the failure forecasting system 100. The GUIs can be used by personnel within the plant to monitor each equipment and particular materials or parts within the equipment. Another application includes the inventory management tool 112 which can output optimized stocking levels for various materials. The output from the inventory management tool 112 in combination with the simulations 162 can enable another application—the maintenance scheduler 114 to output optimized maintenance schedules for each equipment in the plant.

Figure 2:
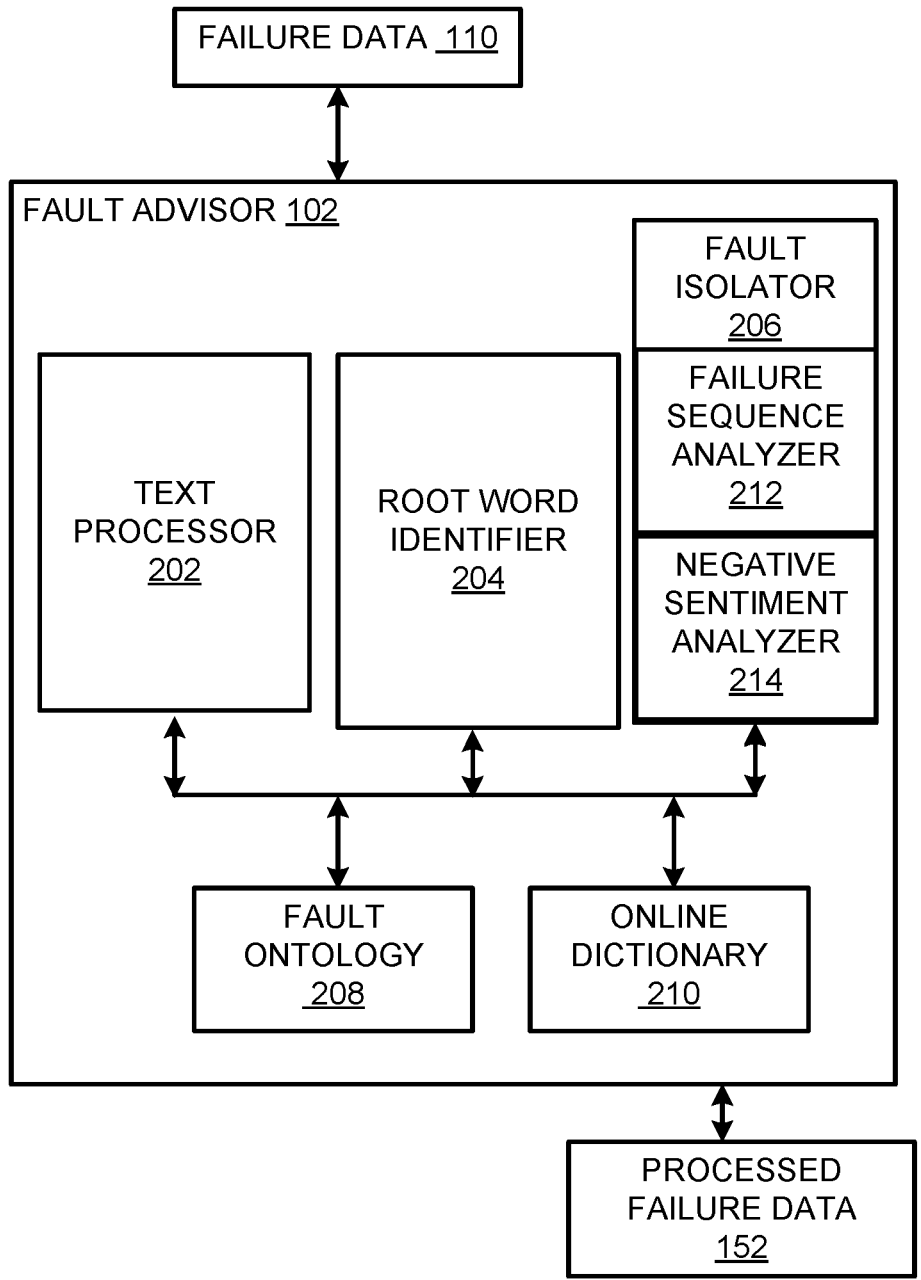
FIG. 2 shows a detailed block diagram of a fault advisor in accordance with the examples disclosed herein.

FIG. 2 shows a detailed block diagram of the fault advisor 102 in accordance with the embodiments disclosed herein. The fault advisor 102 includes a text processor 202, a root word identifier 204 and a fault isolator 206. The text processor 202 accesses the failure data 110 from the data sources 150 which is generally in the form of free text format. Accordingly, textual processing techniques for understanding the free text, eliminating noise, identifying keywords and distinguishing between positive and negative sentiments are applied to the failure data 110. The text processor 202 can be configured for initial tokenization, removal of stop words or junk words and punctuations. The word tokens produced by the text processor 202 upon the removal of junk words can be tagged with parts of speech (POS) data.

The failure data 110 which is partially processed by the text processor 202 can be accessed by the root word identifier 204 for further textual processing including word stemming and for identifying synonyms. The POS tags can be used to identify verbs and nouns for word stemming and for root keyword identification. The root word identifier 204 refers to a fault ontology 208 to identify the words that refer to specific faults or failures. If a word cannot be found in the fault ontology 208, the root word identifier 204 can refer to an online dictionary 210 such as WordNet in order to obtain the synonyms of the words. The synonyms can be used to identify the corresponding fault words from the fault ontology 208. In an example, the fault words that are previously identified are accessed and the synonyms of the fault words are retrieved. A new keyword that cannot be found in the fault ontology is compared with the previously identified fault words. If a match is established between the new keyword and at least one of the previously identified fault words, the definition of the fault words is updated with the new keyword.

Generally a material or part may fail due to multiple reasons and in multiple ways. For example, the failure may be at the end of a chain of multiple failures. Accordingly, the fault ontology 208 can define multiple fault modes starting with a primary failure and ending with a tertiary failure and the fault isolator 206 includes a failure sequence analyzer 212 and a negative sentiment analyzer 214. The failure sequence analyzer 212 can be based on a list of individual faults that substantially represents the different ways in which the parts can fail. In an example, each of the fault modes further includes multiple levels, wherein each level further including a plurality of words. A fault or failure can be identified as a primary fault, secondary fault or tertiary fault based on a serial occurrence of words from the failure data 110 match a series of words from each of the different levels of a particular fault mode.

The POS tags associated with the words in the failure data 110 can help identify the order of the words in a particular failure message so that false failure data, such as a fault word with a negation e.g., "no leak" can be eliminated by the negative sentiment analyzer 214. "Pattern analysis" is performed on cleaned text gathered from the various data sources. The cleaned text includes text devoid of punctuation, articles, prepositions but prior to the negative sentiment analysis and stemming. The pattern analysis maps "words/phrases which represent non-issues" (non-issue words) against "words/phrases that occur around them" (forceful words). By performing such analysis on millions of lines of (technical) text, from various sources, and after performing a Pareto Analysis on the result, it was identified that the following "forceful words" attached to over 95% of "non-issue words. Non-limiting examples of such forceful words include, "no", "not", "not found", "all ok" and "found no". This analysis can be repeated periodically to account for changes in "style of writing", "the algorithm which does the translation", etc.

Furthermore—there can be some domain-specific non-issue words which, in the context of the particular domain e.g., electro-mechanical fault classification, are important and should not be extracted out from text. They are "exceptional non-issue words". These words are neither contextual nor dynamic in nature. A dictionary of such words can be formed by a SME with the insights gleaned from working in the domain and by trial and error. Non-issue words are thus recognized with the help of the pattern they form with "forceful words".

Additionally, a combination of POS tags and keywords identified from the fault ontology 208 or the online dictionary 210 enable identifying faults associated with negations. For example, a combination of words "not tight" can indicate a faulty, loosened part of an equipment. The negative sentiment analyzer 214 can identify tight as a desirable attribute which, when combined with a negation can be identified as a fault. The fault isolator 206 therefore not only determines the faults but is also configured to identify specific fault modes such as primary fault, etc. The processed failure data 152 including specific faults and fault attributes and/or suspensions is thus produced by the fault advisor 102.

Figure 3:
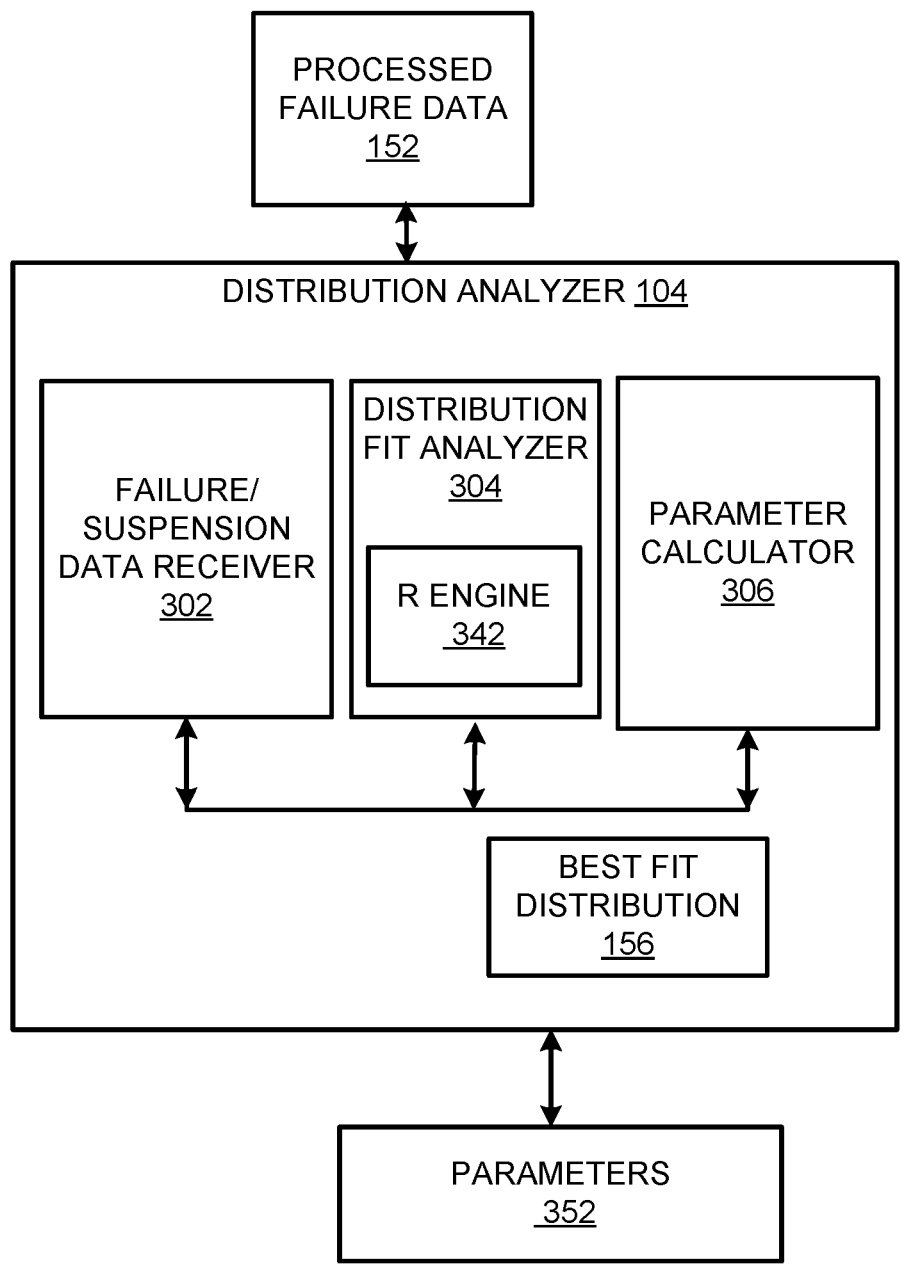
FIG. 3 shows a block diagram of a distribution analyzer in accordance with some examples.

FIG. 3 shows a block diagram of the distribution analyzer 104 which is used to identify a best fit data distribution for the failure data of the material when used in a particular equipment in accordance with some examples. The distribution analyzer 104 includes a failure/suspension data receiver 302, a distribution fit identifier 304, and a parameter calculator 306. The failure/suspension data receiver 302 accesses the processed failure data 152 which includes information regarding specific faults that have occurred (i.e., failures) and/or faults which are likely to occur (i.e., suspensions). Specific incidents of actual failures versus suspensions can be identified based on incident metadata indicating whether the maintenance that occurred in response to the incident corresponds to reactive maintenance or scheduled maintenance. Reactive maintenance occurs in reaction to an actual fault or failure that is detected. Scheduled maintenance can occur based on a maintenance routine even in the absence of an actual fault or failure.

In an example, temporal attributes of the faults and suspensions included in the processed failure data 152 which can enable obtaining metrics such as TTF by the failure/suspension data receiver 302. The processed failure data 152 including calculated metrics such as TTF are provided to the distribution fit identifier 304. The processed failure data 152 which includes data regarding both failures and suspensions can more accurately predict future failures as compared to data which may include only failures. The distribution fit identifier 304 selects one of the plurality of data distributions that best fits the processed failure data. By way of illustration and not limitation, the distribution fit identifier 304 can select from one of Weibull, Log Normal or Exponential distributions as a best fit for the processed failure data 152. In an example, the distribution can be initially selected based on the best fit for the failure data and the selected distribution can be further modified to include the suspension data. In an example, the distribution fit identifier 304 can include a R-engine 342 to receive the processed failure data 152 for identifying the best fit distribution for the failures. R-engine 342 is developed in the R programming language. Various criteria such as but not limited to, Chi-Square test, Kolmogorov-Smirnoff Test, and Akaike Information Criterion can be used to identify the best fit among the various data distributions.

The selected data distribution is used by the parameter calculator 306 to obtain the parameters of the data distribution. The parameters 352 can be used to estimate reliability of each material for a given time period. The parameters 352 include the eta (η) or the scale parameter and the beta (ß) or the shape/slope parameter. The selected data distribution provides an analysis of the failure rate versus time in one example. If f(t) is considered as the failure rate and the Weibull data distribution is selected, the probability density function is given by:

$$f(t) = \frac{\beta}{\eta}\left(\frac{t}{\eta}\right)^{\beta-1} e^{-\left(\frac{t}{\eta}\right)^{\beta}} \qquad \text{Eq. 1}$$

When η=ß=mean time to failure or (MTTF), the MTTF for a given material can be obtained as:

$$\bar{T} = \eta \cdot \Gamma\left(\frac{1}{\beta} + 1\right) \qquad \text{Eq. 2}$$

The Weibull cumulative density function (CDF) is given by:

$$F(t) = 1 - e^{-\left(\frac{t}{\eta}\right)^{\beta}} \qquad \text{Eq. 3}$$

The reliability R(t) can be obtained as a function of time wherein, R(t)=1−CDF, therefore, $$R(t) = e^{-\left(\frac{t}{\eta}\right)^{\beta}} \qquad \text{Eq. 4}$$

When ß is less than 1, the distribution exhibits a decreasing failure rate over time. When ß is equal to 1, the distribution has a constant failure rate over time and a Weibull distribution may reduce to an Exponential distribution. When β is greater than 1 the distribution exhibits an increasing failure rate over time. Best fit curves can be identified for each of the materials that are used and stocked in the inventory at the manufacturing plant. Based on the data such as MTTF, future failures can be forecasted. In an example, similar materials can be grouped into "material families" to increase data availability for better analysis.

Figure 4:
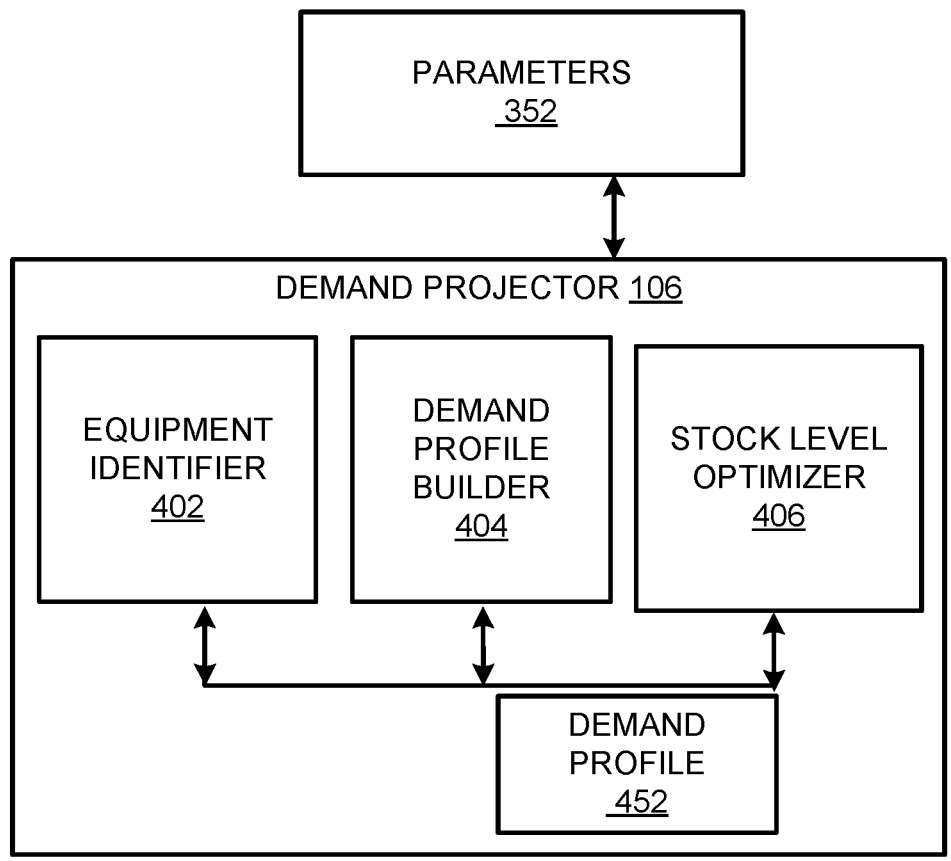
FIG. 4 shows a block diagram of a demand projector in accordance with the examples disclosed herein.

FIG. 4 shows a block diagram of the demand projector 106 in accordance with the examples disclosed herein. The demand projector 106 includes an equipment identifier 402, a demand profile builder 404 and a stock level optimizer 406. The eta (η) and the beta (ß) parameters obtained from the best fit data distribution are used to generate demand profiles for the material by the demand projector 106. In an example, demand profiles for the materials are built using Monte Carlo simulations. The demand profile 452 provides an estimation of a future probability of failure of the material in each equipment piece of the multiple equipment pieces that include the material. The demand projector 106 therefore estimates future demand for the material across all the pieces of equipment within the plant. Accordingly, the equipment identifier 402 initially identifies each equipment piece within the plant that includes the material.

The demand profile builder 404 can aggregate the best fit failure distributions of the material from the multiple equipment that include the material to build a combined demand profile of the aggregated distributions using Monte Carlo simulations. When Markov chains are used in reliability analysis, the process represents the various stages or states that a system can be in at any given time. The states are connected via transitions that represent the probability or rate that the system will move from one state to another during a step or a given time. For the case where the material transitions from a healthy state to a failed state with lambda being the rate parameter for transitions from the healthy state to the failed state, the corresponding probability functions with time pertaining to the exponential distributions are given by:

$$P_0(t)=e^{-\lambda t} \qquad \text{Eq. (5)}$$

$$P_1(t)=1-e^{-\lambda t} \qquad \text{Eq. (6)}$$

When multiple states are involved, the probability of the material moving in and out of one state to another can also be obtained. The Markov chains are therefore defined wherein the parts in the material are identified in addition to the beginning, intermediate and the end states. The state equation is derived using the individual failure rates and the steady state failure rate for the material is determined. Once the Markov chains are set up for the material being monitored for failures, the demand profile can be simulated at each state of the Markov Chain by using Monte Carlo simulations. By generating thousands of iterations of the demand profile, the MTTF of the material at each functional location i.e., at each equipment where the material is used is obtained. The inventory levels and the corresponding reliability of the material are then simulated by the stock level optimizer 406 using the Markov chain with the MTTF of the material. The stock level optimizer 406 can be configured to identify an inventory level for the material to maximize the reliability of the equipment (or the multiple pieces of equipment) that includes the material.

Figure 5:
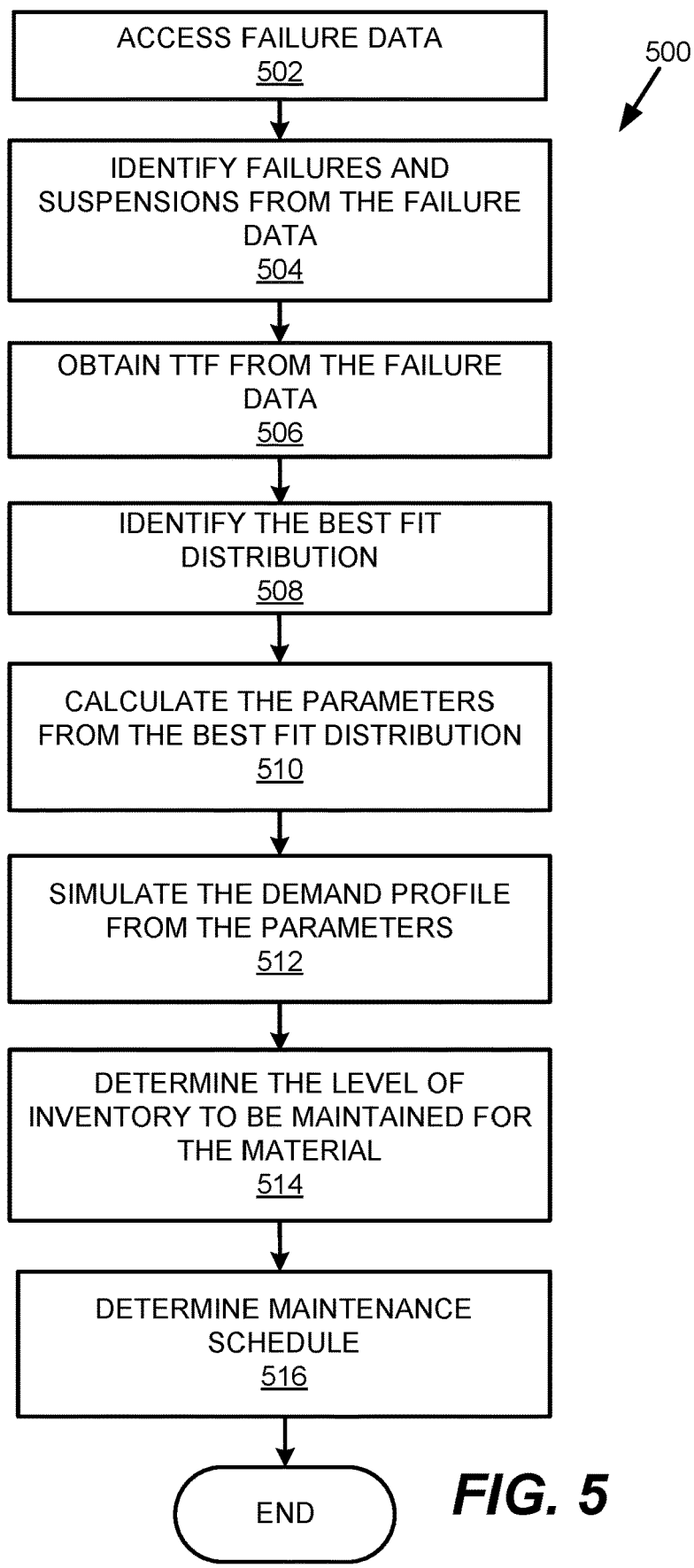
FIG. 5 shows a flowchart that details a method of forecasting material failures and improving equipment reliability in accordance with the examples disclosed herein.

FIG. 5 shows a flowchart 500 that details a method of forecasting material failures and improving equipment reliability in accordance with the examples disclosed herein. At 502, the failure data 110 collected from the data sources 150 for a particular material is accessed by the failure forecasting system 100. In an example, the failure data 110 collected at 502 can include, the equipment ID, malfunction start date, time, the TTF and the type of failure that identifies whether the failure is an actual failure detected in a reactive maintenance process or a suspension detected during a scheduled maintenance process. In an example, the TTF for each equipment is calculated as the difference between two consecutive failure dates.

The failure data 110 is processed at 504 via textual processing techniques to identify actual failures and suspensions for the material. Historical work order data associated with the material which is extracted at 502 is treated with text analytics to not only identify the fault words that may be positively recited but also those fault words that are accompanied by negations. The text analytics also need to include techniques for eliminating fault words associated with false positives that can mislead the failure forecasting system 100 into identifying as failures words that don't pertain to actual failures or suspensions. For example, a sentence from a log in one of the data sources 150 may read as, "Customer was unhappy. Investigated for leak. We found that pipe was not leaking. The hose was hard. Replaced the hose". Unless the stemmed version of the word "leaking" (which is combined with a negation 'not") is removed, the fault or failure within the material cannot be accurately identified. Some example negations can include but are not limited to, no, not, nothing, without, not found, etc. Some words expressing positive sentiments can also indicate a negation of faults e.g., "all ok". Further examples of negations can include word prefixes or suffixes such as "unclean", etc. After analysis and stemming of the sentence, root words like "customer, unhappy, investigate, noisy, lower, bracket, hose, hard and replace, etc." As mentioned above, the fault advisor 102 is also configured to identify faults associated with negations. For example, if a sentence reads as, "The hose was not tight," the words "not tight" indicate a fault and should not be removed. Based on the comparison of the keywords from the sentence to words in the fault ontology 208, the actual faults can be determined and registered, for example, in the data store 180. Moreover, the combination of words in a sentence or sentences that are indicative of a sequence of faults are also identified using the multiple fault modes with a plurality of levels included in the hierarchical and sandwich stack of fault structures as detailed infra within the fault ontology 208.

The processed failure data 152 thus generated by the fault advisor 102 is used to obtain TTF between the consecutive incidents is obtained at 506. The TTF data is provided to the distribution fit analyzer at 508 in order to identify one of the plurality of data distributions that best fits the processed failure data 152. In an example, the TTF can be provided to the R-engine 342 in order to identify the best fit data distribution from the plurality of data distributions. Statistical tools such as Q-Q plots and P-P plots can help in confirming the chosen data distribution fit. The parameters 352 are calculated form the best fit distribution 156 at 510. More particular, the shape parameter and the scale parameter values are obtained at 510 using the best fit distribution 156. It is noted that the best fit distribution 156 which includes suspensions can give different parameter values as compared to the data distribution that only includes failure incidents.

At 512, the parameters 352 from the best fit distribution 156 are used to simulate the demand profile 452 for the material for a given time period. The demand profile 452 can outline the demand for the material in a given month. The demand profile 452 can also provide forecasts of the prospective demand for the material in a future time period. The prospective demand for the material arises when there is a failure or suspension associated with the material in any of the plurality of equipment pieces that the material may be used. In fact, a plurality of demand profiles indicative of future demand for the material can be simulated for specific time periods based on different simulations 162 generated via Monte Carlo method. As mentioned herein, the simulations 162 can include projections or temporal forecasts for material failures based on historical values from the failure data 110. Accordingly, the different simulations 162 can lead to different projections or forecasts for reliability/availability of a given equipment that includes the material. At 514 the simulations 162 can be used to determine optimized minimum and maximum levels of inventory to be maintained for the material in order to improve the reliability of the equipment including the material. Similarly, the forecasted demand points can be used to determine maintenance schedules at 516 for the equipment that includes the material.

Figure 6:
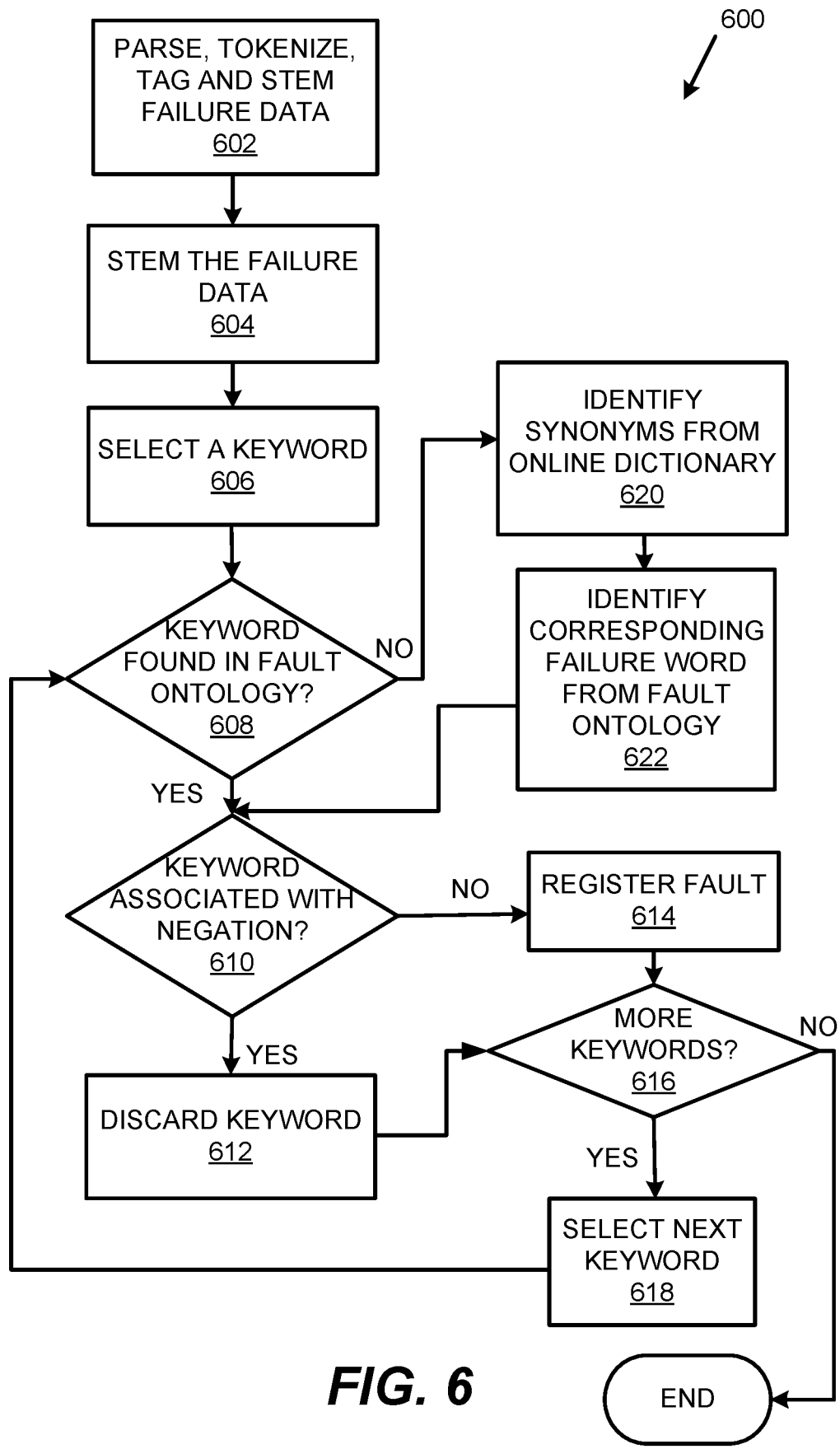
FIG. 6 shows a flowchart that details a method for extracting details of incidents of failures and suspensions from failure data in accordance with some examples.

FIG. 6 shows a flowchart 600 that details a flowchart 600 for extracting details of incidents of failures and suspensions from the failure data 110 in accordance with some examples. The method begins at 602 wherein the failure data 110 is parsed, tokenized, processed to remove punctuation, stop words, etc. The output from the tokenization can be further tagged with POS data. The tokens with the POS data can be further stemmed. At 604, certain root keywords are extracted from the tokens obtained from the failure data 110. For example, a piece of textual data such as "customer unhappy investigate noisy lower bracket hose hard replace hose" can be processed to obtain root keywords customer, unhappy, investigate, noisy, lower, bracket, hose, hard and replace.

At 606, a keyword from the extracted root keywords is selected and it is determined at 608 if the selected keyword are found in the fault ontology 208. If it is determined at 608 that the keyword is found in the fault ontology 208, the process moves to 610 wherein it is further determined if the keyword is associated with a negation, e.g., preceded by a negation. If it is determined at 608 that the keyword is associated with one of multiple negations, the keyword is discarded at 610 and it is determined at 616 if more keywords remain to be processed. If yes, the next keyword is selected at 618 and it is determined at 608 if the selected keyword is found in the fault ontology 208. If it is determined at 608 that the keyword is not associated with a negation, a fault is registered against the material at 614 and the process moves to 616 to determine if further keywords remain to be processed. If it is determined at 616 that no further keywords remain for processing, the process terminates on the end block.

If it is determined at 608 that the keyword is not found in the fault ontology 208, the method proceeds to 620 wherein the online dictionary 210 is searched to identify and retrieve synonyms for the keyword. The synonyms that are retrieved at 620 and are again compared with the fault ontology 208 to identify the corresponding fault word from the fault ontology 208 at 622. The method again returns to 610 to determine if the keyword is associated with a negation. The process moves to 612 or 614 depending on the association of the keyword with a negation. The processing of keywords is described as occurring serially only for illustration purposes. It can be appreciated that the keywords can be processed simultaneously in parallel to speed up the identification of faults within the failure data 110.

Figure 7:
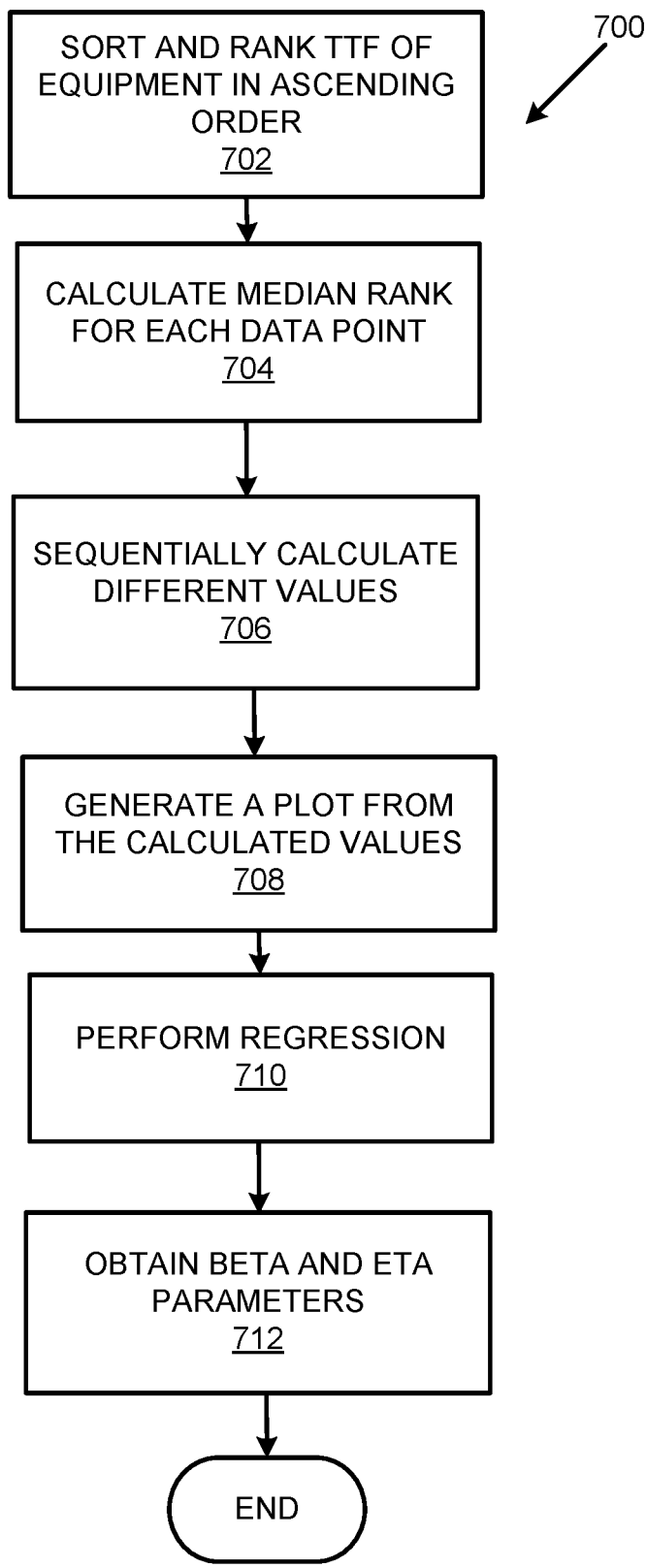
FIG. 7 shows a flowchart that details a method of calculating parameters from a best fit distribution in accordance with the examples disclosed herein.

FIG. 7 shows a flowchart 700 that details a method of calculating the parameters from the best fit distribution 156 in accordance with the examples disclosed herein. In an example, the rank regression method is used as outlined below. The method begins at 702 wherein the TTFs of the various equipment pieces using the material are sorted and ranked in ascending order. At 704, the median rank for each data point is obtained using the formula:

Median Rank for a data point=(Rank−0.3)/(no. of failures+0.4)

At 706, different values including 1/(1−Median Rank), ln (ln (1/(1−Median Rank))), and ln (Equipment TTF) are sequentially calculated. At 708, a plot is generated from the calculated values with ln (ln (1/(1−Median Rank))) on the Y-axis and ln (Equipment TTF) on the X-axis. At 710, regression is performed to obtain summary output and the graph. In an example, tools such as Excel or more particularly, Data Analysis Tool Pack in Excel can be used for performing the regression. At 712, the beta parameter is obtained as the coefficient of the ln (Equipment TTF) in the output and Eta is calculated using Exp (−intercept coefficient/beta).

Figure 8:
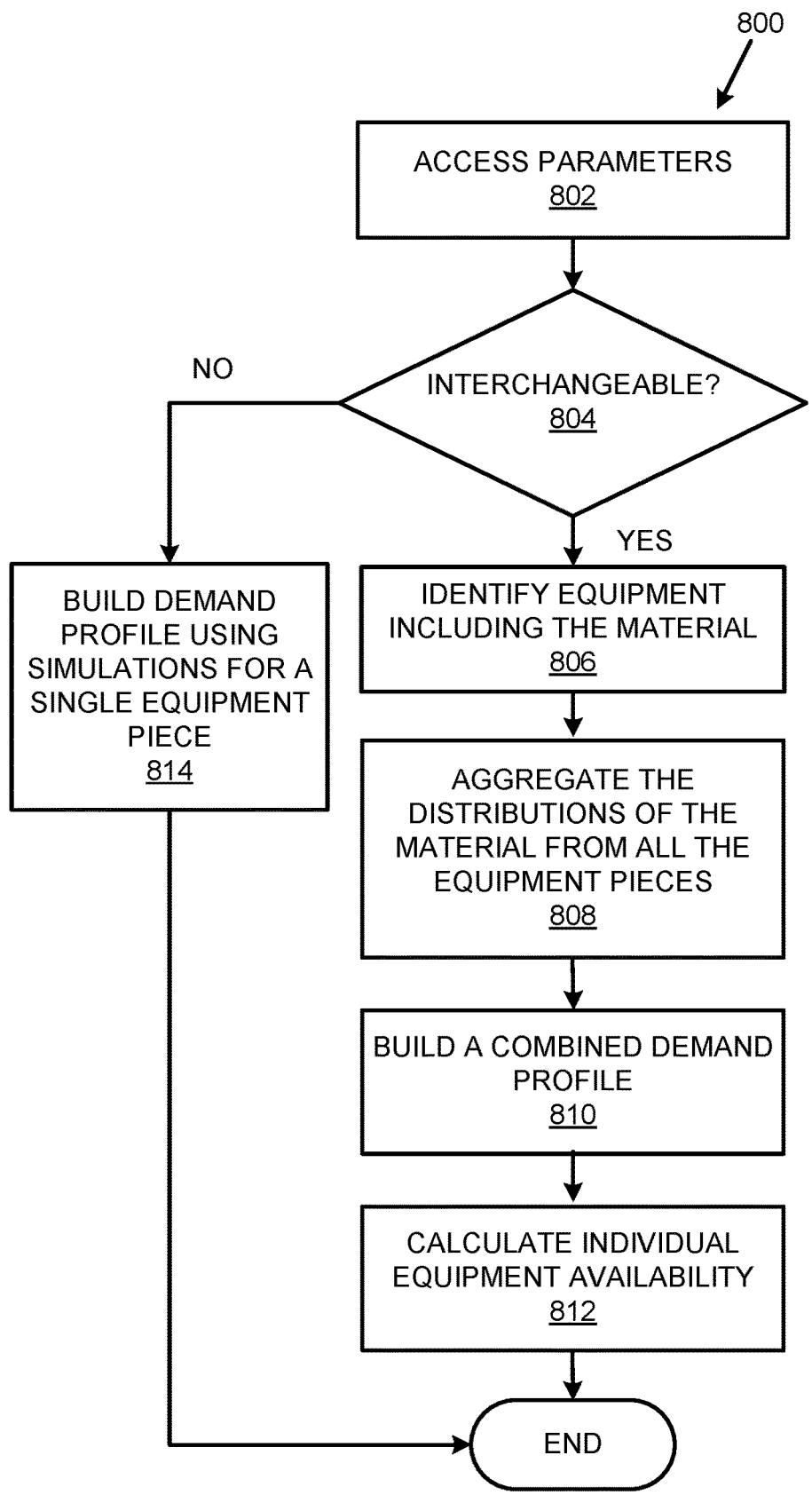
FIG. 8 shows a flowchart that describes a process of generating the distribution profiles for an interchangeable material in accordance with the examples disclosed herein.

FIG. 8 shows a flowchart 800 that describes the process of generating the distribution profiles for an interchangeable material in accordance with the examples disclosed herein. At 802, the parameters from the best fit distribution are accessed. At 804, it is determined if the material or part is an interchangeable material or part which is used in multiple equipment pieces. The determination regarding the interchangeability can be made using the failure data 110 which can include the equipment ids that include the material. If it is determined at 804 that is an interchangeable material, each of the multiple equipment pieces that include the material are identified at 806. The best fit distributions of the material from all the equipment pieces are aggregated at 808. A combined demand profile of the aggregated best fit distributions is built at 810 using the Monte Carlo method. The individual equipment availability is calculated at 812. Different formulae can be employed for calculating the individual equipment availability. For example, A1*A2*A3 . . . can be used for serial calculated of the individual equipment availability while (1/A1)+(1/A2)+(1/A3) . . . can be used for calculating the availability of the individual equipment in parallel. If it is determined at 804 that the material is not interchangeable, the demand profile is built at 814 using the Monte Carlo simulations 162 for the material from a single equipment piece and the method terminates on the end block.

Figure 9:
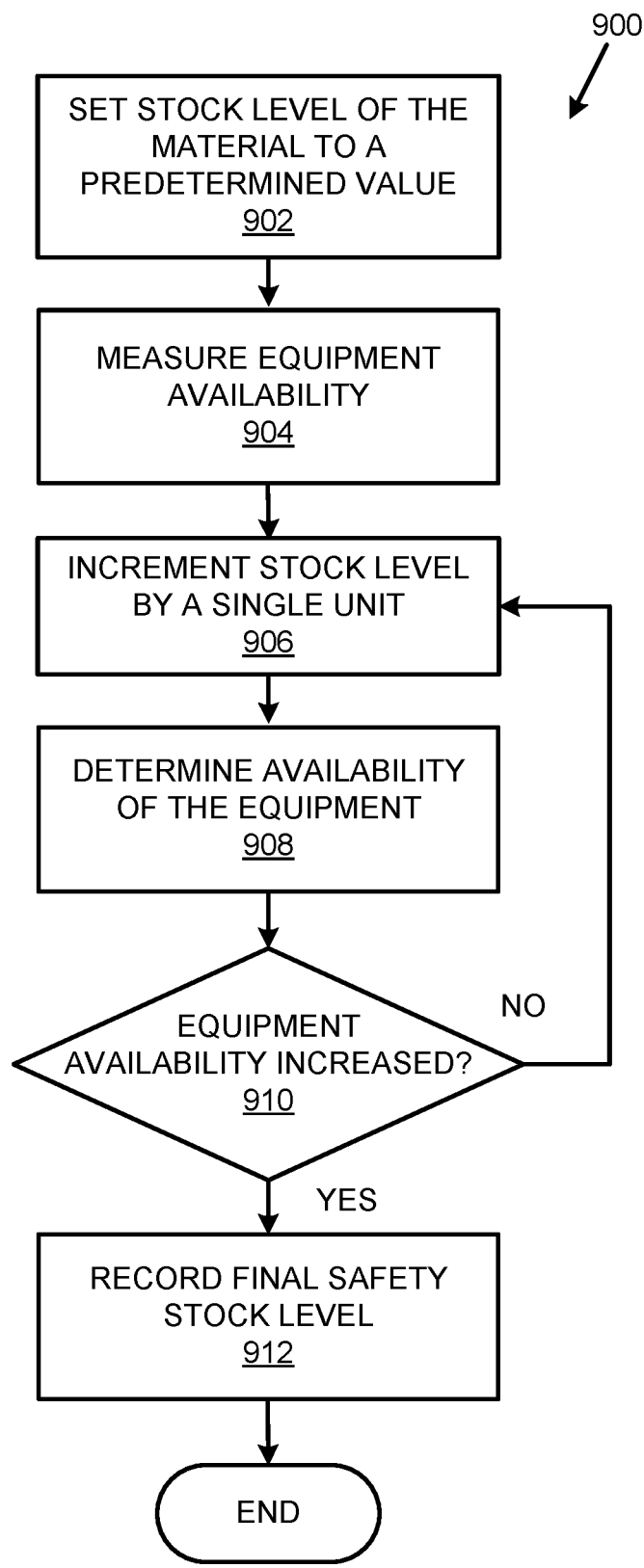
FIG. 9 shows a flowchart that details a method of generating simulations for a material in order to determine the optimal inventory levels in accordance with the examples disclosed herein.

FIG. 9 shows a flowchart that details a method of generating simulations for a material in order to determine the optimal inventory levels in accordance with the examples disclosed herein. In this case, the material availability for a piece of equipment is considered for simplicity. At 902, the stock level of the material for the equipment can be set to a predetermined value. In an example, the stock level of the material for the equipment can be initially set to zero. At 904, the availability of the equipment is measured using the formulae described above from the Monte Carlo simulations. At 906, the stock level is incremented by predetermined values e.g., a single unit and the availability of the equipment is again determined at 908. At 910, it is determined if the availability of the equipment obtained with the current stock level is greater with the availability of the equipment at the prior stock level. The availability of the equipment can be determined, for example, as time between failure incidents when the equipment is unavailable. So if greater time has elapsed between failure incidents i.e., TTF increases, the equipment availability also increases. If yes, the process returns to step 906 to again increment the stock level by a single unit. The steps 906, 908 and 910 are thus repeated until the availability of the equipment despite increased stock level of the material remains constant. When it is determined at 910 that the availability of the equipment with the current stock level remains constant as compared with the availability of the equipment at the prior stock level, the current stock level can be recorded as the final safety stock level of the material at 912.

Figure 10:
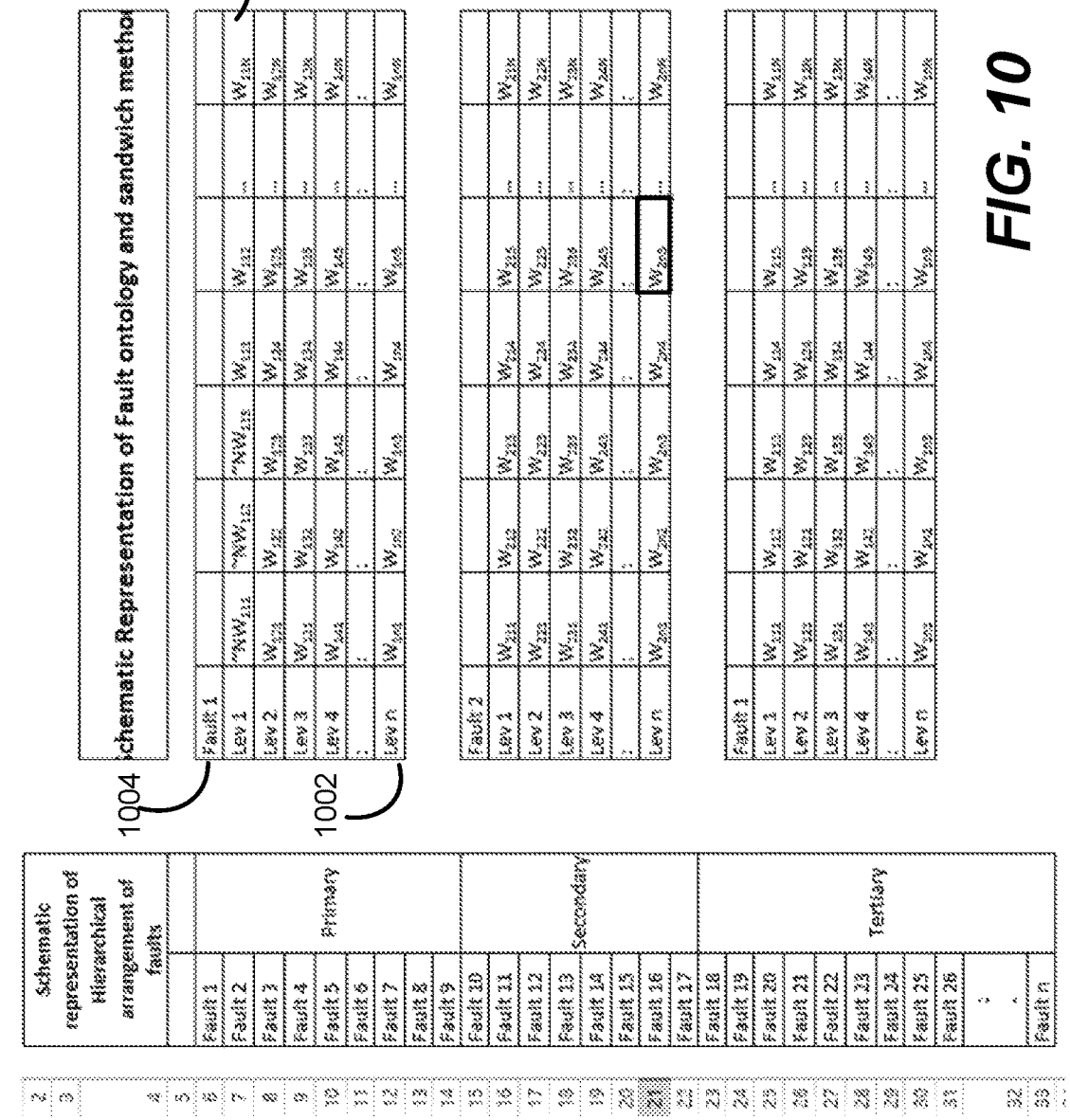
FIG. 10 shows an example data structure for the fault ontology in accordance with the disclosed examples.

FIG. 10 shows an example data structure for the fault ontology 208 wherein the faults are arranged in a hierarchical arrangement in accordance with the disclosed examples. The fault ontology 208 encodes subject knowledge wherein experiences regarding faults/failures of subject matter experts are incorporated as multiple failure modes. The fault ontology 208 includes faults wherein each fault is associated with a plurality of levels, Lev 1, Lev, etc. Each level 1002 includes multiple fault words e.g., word $W_{121}$, word $W_{122}, \ldots W_{1nN}$. $N_{wFnN}$ represents a unique nor word, $W_{FnN}$ represents a unique positive word wherein F is a fault number, n is the level number and N is the word number. A fault word within the failure data 110 can be identified as being included in the fault ontology 208 if the textual content for the fault follows a semantic structure reflected in the multiple levels of that fault. For example, Fault 1 1004 can be identified if one of the fault words $W_{121}$, $W_{122}$, ... $W_{12N}$. from Lev 1 1006 is combined with one of the words of Lev 2, one of the words from Lev 3, etc. If a word from the failure data 110 does not match any of the fault words from the fault ontology 208, then synonyms from an online dictionary can be selected. The synonyms that are retrieved are again compared with the fault ontology 208 to identify the corresponding fault word from the fault ontology 208. Moreover, each of the faults can be categorized into a fault mode which includes a primary mode 1012, a secondary mode 1014 and a tertiary mode 1016. For example, if fault 1 corresponds to a word 'loose', then Lev 1 of fault 1 may include a word 'pipe', Lev 2 may include a word 'bolt' and so on. A final failure can be a sequence of the failure incidents wherein at each incident, a fault occurs from each of the primary, secondary or tertiary fault modes. For example, failure incidents can include loosening of a bolt, a coolant level dropping and an activation of a sensor. The initial failure incident i.e., loosening of the bolt can be classified as a primary fault, dropping of the coolant level is a secondary level fault while the activation of a sensor is a tertiary level fault. The failure sequence analyzer 212 is configured to classify the faults from the failure data 110 based on text matching techniques.

FIG. 11 shows the various data distributions that are generated for the failure data 110 in accordance with the examples disclosed herein. The plots 1102 show cumulative density function (CDF) curves for the Weibull, log-normal and gamma distributions for failures only but not suspensions. The plots 1104 show the CDFs for the Weibull, lognormal and gamma distributions for both failures and suspensions. In the example shown in FIG. 11, the MTTF 1106 as obtained for the material with failures only is about 14.388 whereas the MTTF 1108 when considering both failures and suspensions is lower at 10.178. The higher MTTF 1106 when considering failures only i.e., incidents where the material has positively failed can lead to lower inventory stocking and a maintenance schedule where an equipment may be unavailable due to the failure of the material. However, when potential failures i.e., suspensions are considered, the lower MTTF 1108 leads to stocking more of the material and more aggressive maintenance schedules for the equipment including the material. It can be appreciated that the case for considering only failures versus failures and suspensions in the failure data 110 is shown only by way of illustration and that other possibilities exist where a reduction of the existing stock levels or a less aggressive maintenance schedule may be suggested.

FIG. 12 shows the demand profiles that are simulated from the best fit distribution parameters in accordance with the examples disclosed herein. Two simulations or demand profiles 1202 and 1204 are shown. The demand profiles 1202 and 1204 indicate the months and the number of failure incidents associated with each of the materials or various parts, i.e., the gasket, sleeve, gauge and u-cup in that month in addition to providing an availability estimate for equipment pieces including one or more of the gasket, the sleeve, the gauge and the u-cup. The simulations can be generated using parameters from the best fit distributions and attributes such as, current availability of each equipment piece of the multiple equipment pieces that includes the at least one material and a list of spares used within the equipment piece. As seen at 1202 and 1204, the availability of a particular piece of equipment depends on the availability of the various parts/materials that make up the equipment. For example, at 1202, the availability of the equipment (as indicated as 0 or 1) can depend on the number of failure incidents associated with each of the gasket, sleeve, gauge and U-cup. For example, there are no failure incidences and hence the equipment 1 is available all through the month at month 1 in the demand profiles 1202 and 1204. The demand profile 1202 is generated without considering the interchangeability i.e., without taking into consideration, how the usage of a part for a piece of machinery from a store can affect the availability of another piece of machinery that may use the same part. This is because, if an equipment fails and a part or material is replaced within the equipment from the store, it automatically depletes the amount of that material or the number of parts available for other equipment that may employ the same material or part. As a result, the likelihood of unavailability of the other equipment increases. This is indicated by the availability values 1208 and 1210. The availability 1208 indicates 46% without interchangeability at the demand profile 1202. At the demand profile 1204, the availability as shown at 1206 for one equipment (e.g., pump) remains at 46% whereas the availability reduces to 38% for another equipment (e.g., turbine) when interchangeability is considered.

Figure 13:
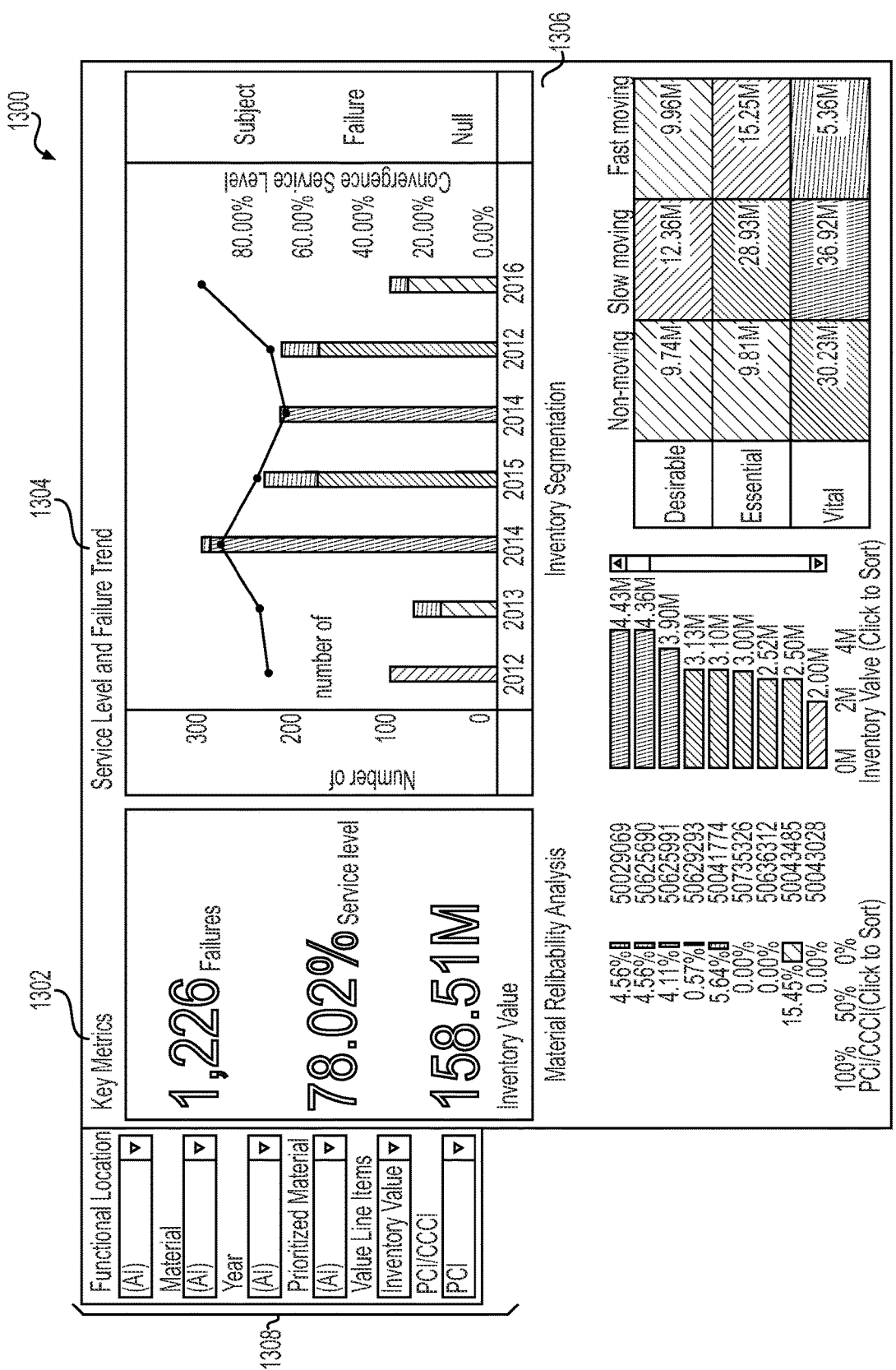
FIG. 13 shows an example GUI that includes an equipment overview dashboard in accordance with the examples disclosed herein.

FIG. 13 shows an example GUI that includes an equipment overview dashboard 1300 in accordance with the examples disclosed herein. The equipment overview dashboard 1300 forms part of the failure forecasting system 100 and can be configured to convey data such as showing historical failure trends for each equipment. For example, information corresponding to the equipment such as key metrics 1302, service level and failure trend 1304 are conveyed. In addition, the GUI 1300 can also provide survival analysis (i.e., frequency of failure) for each component material that is included in the equipment. Inventory segmentation 1306 can display the component materials of the equipment sorted by their attributes such as those which are desirable, essential, vital, non-moving, slow moving, fast moving, etc. In addition, the GUI 1300 also provides selection options 1308 for selecting specific component materials with the corresponding attributes such as the functional location, the particular material, the year, the value, etc.

Figure 14:
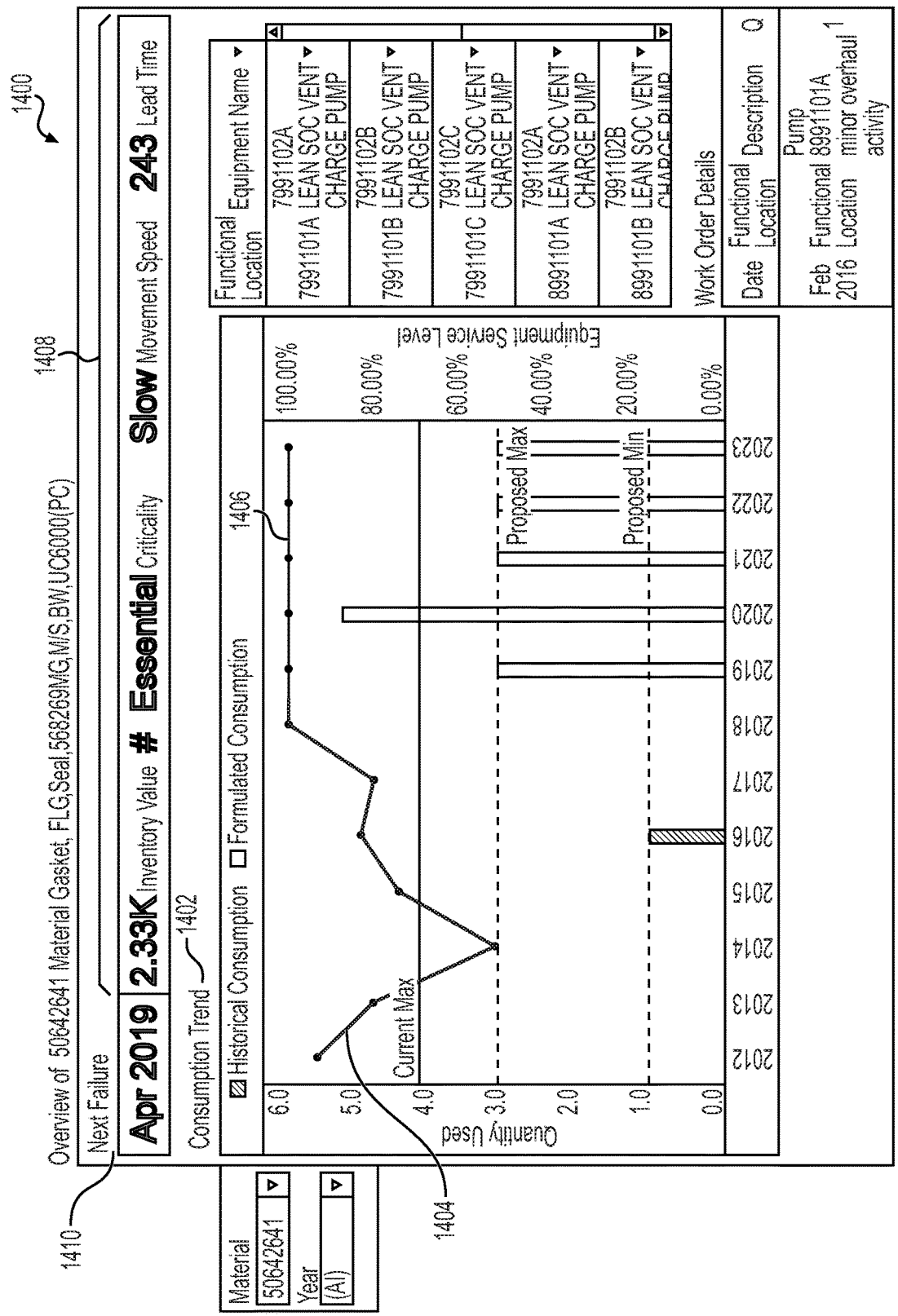
FIG. 14 shows a GUI that includes a material recommendation dashboard associated with the failure forecasting system in accordance with the examples disclosed herein.

FIG. 14 shows yet another GUI that includes a material recommendation dashboard 1400 associated with the failure forecasting system 100 in accordance with the examples disclosed herein. The material recommendation dashboard 1400 shows for a particular material, e.g., a gasket/seal, the historical failures and usage trends as shown by a plot of the consumption trends 1402. The consumption trends 1402 show the quantities used over a time period with actual usage 1404 and forecasted usage 1406. Attributes 1408 such as criticality, movement speed from the inventory, lead time and inventory value are shown. In addition, a prediction for the next failure of the material 1410 is displayed.

Figure 15:
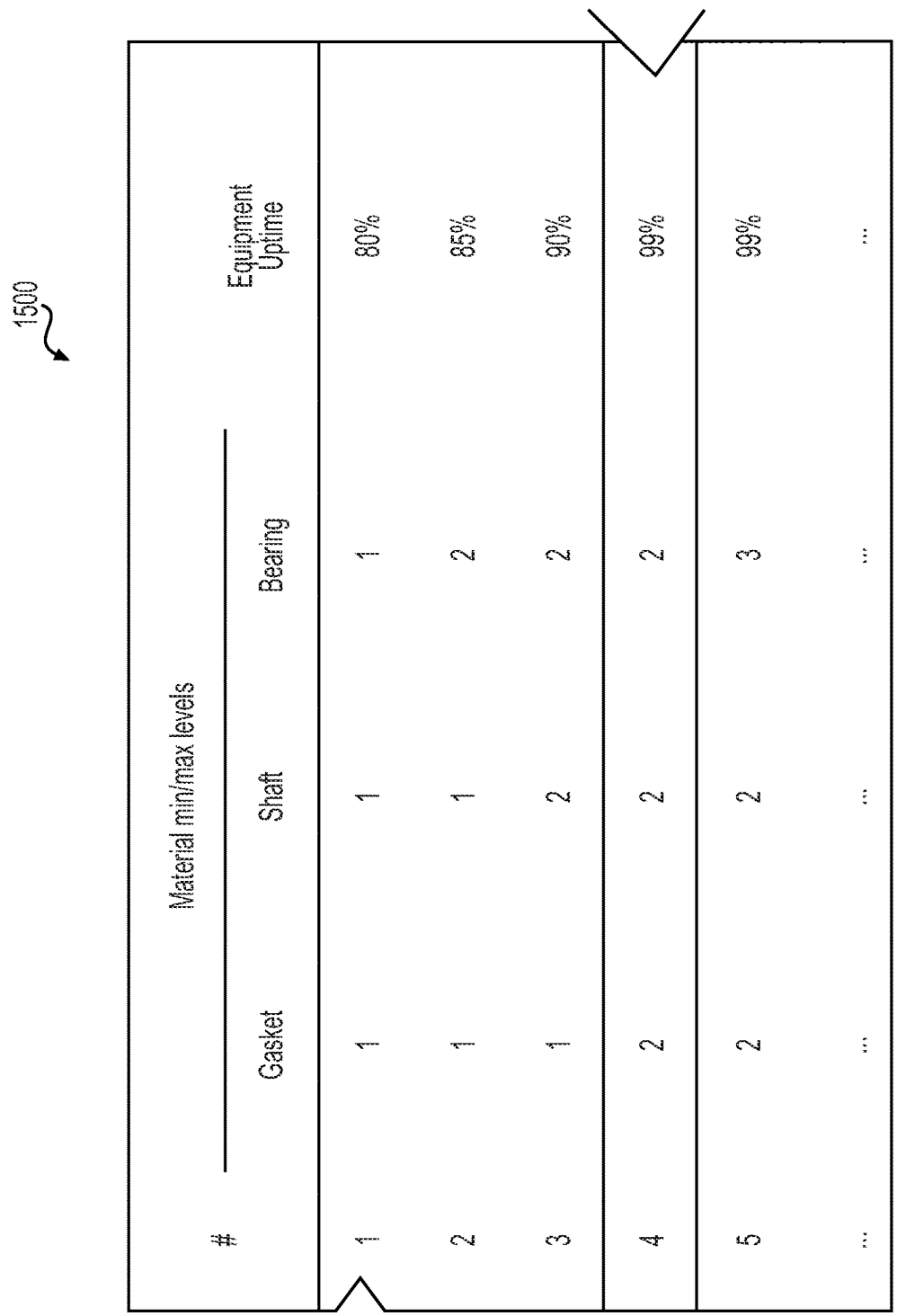
FIG. 15 shows an example simulation for an equipment in accordance with the examples disclosed herein.

FIG. 15 shows an example simulation 1500 for an equipment in accordance with the examples disclosed herein. Three of the components of the equipment which include a gasket, a shaft and a bearing are considered for the simulation 1500. The simulation 1500 is generated from the material failure probabilities output from the best fit distribution. In addition, the current availability of the component materials is considered along with the list of spares used within each equipment. Starting from a minimum and maximum inventory level of 1 for each component material, the simulation varies the min/max levels per material. It can be noted at the $4^{th}$ iteration that increasing the min/max levels beyond 2 does not improve service level thus identifying the optimized inventory levels for each of the plurality of component materials of the equipment.

Figure 16:
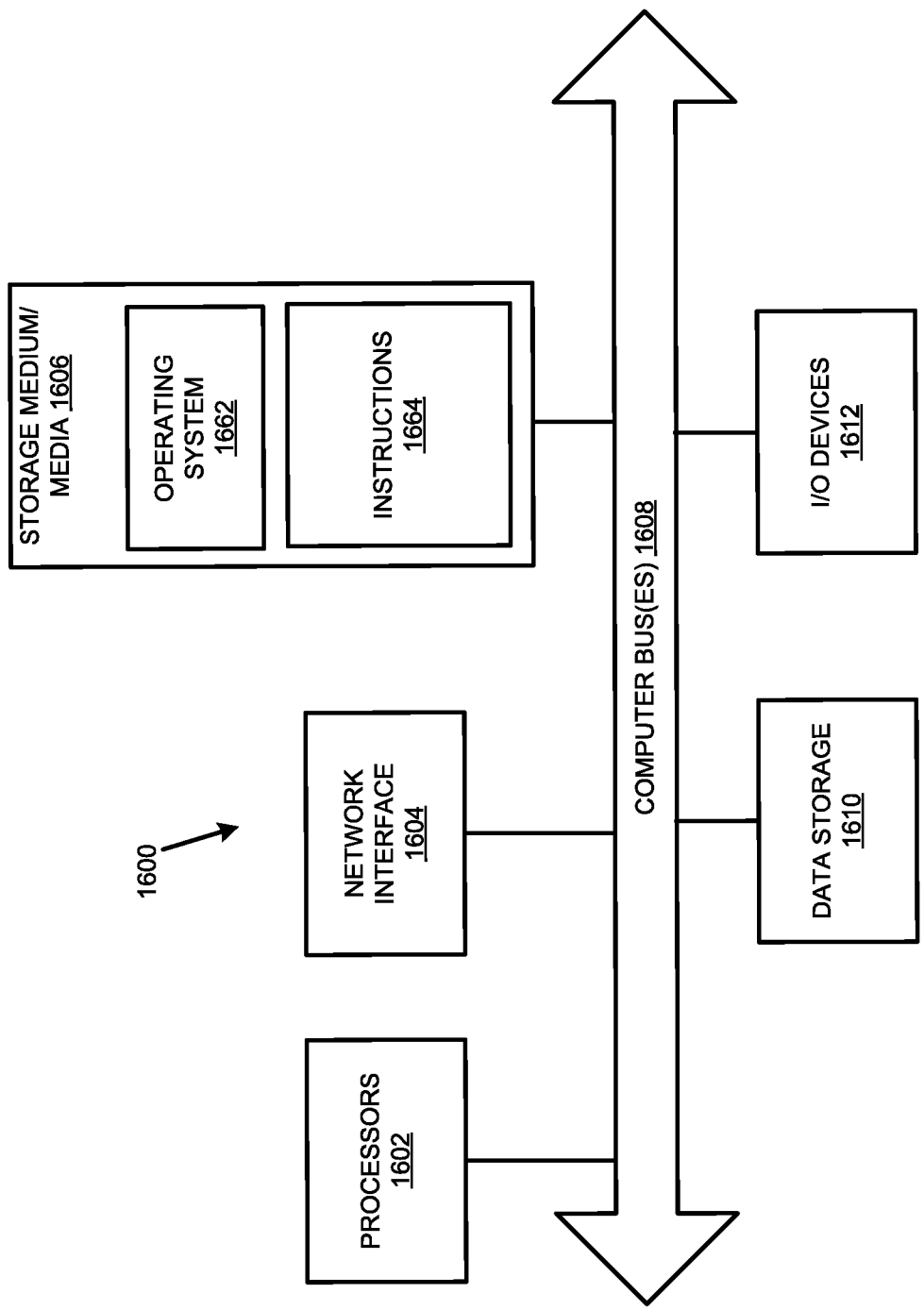
FIG. 16 illustrates a computer system that may be used to implement the failure forecasting system in accordance with the examples disclosed herein.

FIG. 16 illustrates a computer system 1600 that may be used to implement the failure forecasting system 100. More particularly, computing machines such as desktops, laptops, smartphones, tablets and wearables which may be used to generate or access the data from the failure forecasting system 100 may have the structure of the computer system 1600. The computer system 1600 may include additional components not shown and that some of the process components described may be removed and/or modified. In another example, a computer system 1600 can sit on external-cloud platforms such as, Amazon Web Services, AZURE® cloud or internal corporate cloud computing clusters, or organizational computing resources, etc.

The computer system 1600 includes processor(s) 1602, such as a central processing unit, ASIC or other type of processing circuit, input/output devices 1612, such as a display, mouse keyboard, etc., a network interface 1604, such as a Local Area Network (LAN), a wireless 802.11× LAN, a 3G or 4G mobile WAN or a WiMax WAN, and a processor-readable medium 1606. Each of these components may be operatively coupled to a bus 1608. The processor-readable medium 1606 may be any suitable medium which participates in providing instructions to the processor(s) 1602 for execution. For example, the processor-readable medium 1606 may be non-transitory or non-volatile medium, such as a magnetic disk or solid-state non-volatile memory or volatile medium such as RAM. The instructions or modules stored on the processor-readable medium 1606 may include machine-readable instructions 1664 executed by the processor(s) 1602 that cause the processor(s) 1602 to perform the methods and functions of the failure forecasting system 100.

The failure forecasting system 100 may be implemented as software stored on a non-transitory processor-readable medium and executed by the one or more processors 1602. For example, the processor-readable medium 1606 may store an operating system 1662, such as MAC OS, MS WINDOWS, UNIX, or LINUX, and code 1664 for the failure forecasting system 100. The operating system 1662 may be multi-user, multiprocessing, multitasking, multi-threading, real-time and the like. For example, during runtime, the operating system 1662 is running and the code for the failure forecasting system 100 is executed by the processor(s) 1602.

The computer system 1600 may include a data storage 1616, which may include non-volatile data storage. The data storage 1616 stores any data used by the failure forecasting system 100. The data storage 1610 may be used to store the processed failure data 152, the parameter values, the simulations 162, etc., required by the failure forecasting system 100.

The network interface 1604 connects the computer system 1600 to internal systems for example, via a LAN. Also, the network interface 1604 may connect the computer system 1600 to the Internet. For example, the computer system 1600 may connect to web browsers and other external applications and systems via the network interface 1604.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A material failure forecasting system comprising:
at least one processor;
a non-transitory processor readable medium storing machine-readable instructions that cause the at least one processor to:
display on a graphical user interface (GUI) an equipment overview dashboard with selection options for materials that include at least one interchangeable material;
receive via the selection options on the equipment overview dashboard, user selection of the at least one material that is included in multiple equipment pieces;
access a plurality of data inputs that include failure data of the at least one user-selected material included in the multiple equipment pieces, wherein the failure data includes at least details regarding incidents of failures and suspensions and wherein the suspensions include probable failures;
extract the details of the incidents of the failures and the suspensions from the failure data, wherein the details include at least fault words associated with negations and at least one of the incidents includes a sequence of one or more of the failures and the suspensions;
generate and store on the non-transitory processor readable medium a fault ontology, wherein the fault ontology includes a hierarchical arrangement of a plurality of faults occurring in the multiple equipment pieces, wherein the plurality of faults are classified into primary, secondary and tertiary fault modes, wherein each of the faults are identified by one or more fault words and combinations of nor word with the one or more fault words wherein each of the one or more fault words and each of the combinations are encoded with a unique pattern of fault number, level number and word number;
identify for the multiple equipment pieces via accessing the fault ontology, at least a subset of the one or more fault words and combinations of the nor word with the one or more fault words that are also included in the fault data via text matching;
determine the sequence of the one or more failures and suspensions for the multiple equipment pieces based on the identification of the subset by matching text of the details of each of the incidents of failures and suspensions from the failure data to the unique patterns of fault numbers, level numbers and word numbers corresponding ones of the primary, secondary and tertiary fault modes in the fault ontology;

feed the failure data to a code module;

build a model corresponding to the failure data using the code module that selects a best fit distribution for the multiple equipment pieces from a plurality of data distributions;

aggregate the models of the failure data of the multiple equipment pieces;

build a demand profile for the user-selected material from the aggregated models using the parameters of the aggregated models, wherein the demand profile provides an estimation of a future probability of failure of the user-selected material in each equipment piece of the multiple equipment pieces that include the user-selected material wherein one or more of the failure and the suspension of the user-selected material in the equipment piece leads to a demand for the user-selected material;

obtain an optimal inventory level to be maintained for the user-selected material from the demand profile via measuring availability of the multiple equipment pieces that include the user-selected material;

display on a simulation graphical user interface (GUI), a simulation based on the demand profile, the simulation showing iterative changes to inventory of the user-selected material that make up one or more components of the multiple equipment pieces leading to the optimal inventory level; and output a maintenance schedule for the multiple equipment pieces that include the user-selected material.

2. The material failure forecasting system of claim 1, wherein to extract the details of the incidents the processor is to:

parse, tokenize, stem and remove stop words the failure data; and identify fault words from the fault ontology wherein the fault ontology includes the plurality of faults that are each associated with a plurality of levels wherein each of the fault words is identified from one of the plurality of faults and from one or more of the plurality of levels associated with the identified fault.

3. The material failure forecasting system of claim 2, wherein to identify the fault words from the fault ontology the processor is to:

identify from an online dictionary, words from the failure data not included in the fault ontology; and determine synonyms for the words not included in the fault ontology based on information retrieved from the online dictionary.

4. The material failure forecasting system of claim 2, wherein the fault words include phrases expressing negative sentiments wherein a noun is combined with one of the negations.

5. The material failure forecasting system of claim 1, wherein to identify the best fit distribution for the failure data the processor is to:

identify the best fit distribution via the code module from a combination of Chi-square test, Kolmogorov-Smirnoff Test and Akaike Information Criteria wherein a best fit is selected from one of the plurality of data distributions that include Weibull distribution, Log-Normal distribution, Exponential distribution and Gamma distribution.

6. The material failure forecasting system of claim 1, wherein to calculate parameters of the data distribution associated with the best fit distribution the processor is to:

calculate eta and beta parameters wherein the eta parameter indicates a likelihood of failure of the user-selected material and the beta parameter indicates a failure rate of the user-selected material.

7. The material failure forecasting system of claim 1, wherein to build the demand profile for the at least one material the processor is to:

generate a plurality of simulations through Markov chain based Monte Carlo simulations for each of a plurality of materials wherein the user-selected material includes the plurality of materials.

8. The material failure forecasting system of claim 7, wherein to build the demand profile for the plurality of materials, the processor is to:

set up Markov chains for each of the plurality of materials.

9. The material failure forecasting system of claim 8, wherein to build the demand profile for the plurality of materials, the processor is to:

simulate the demand profile for each of the plurality of materials at each state of the Markov chain using the Monte Carlo simulations.

10. The material failure forecasting system of claim 9, wherein to simulate the demand profile for each the plurality of materials the processor is to:

use the parameters from each best fit distribution corresponding to of the plurality of materials, current availability of each equipment piece of the multiple equipment pieces that includes the user-selected material and a list of spares used within the equipment piece.

11. The material failure forecasting system of claim 1, wherein to obtain an optimal inventory level to be maintained for the at least one material the processor is to:

generate a plurality of simulations measuring availability of each equipment piece of the multiple equipment pieces that includes the user-selected material.

12. The material failure forecasting system of claim 11, wherein to generate the plurality of simulations the processor is to:

set a stock level of the user-selected material to a predetermined value;

generate a simulation of an availability of the equipment piece when the stock level is set to the predetermined value; and increase the predetermined value from zero in steps of unit quantity of the user-selected material until an availability of the equipment piece remains constant with further increase in the predetermined value wherein the availability is indicative of operational status of the equipment piece.

13. The material failure forecasting system of claim 1, wherein the at least one material includes a plurality of materials and wherein to generate a plurality of simulations the processor is to:

generate a simulation of availability of each equipment piece of the multiple equipment pieces wherein the equipment piece includes the plurality of materials wherein stock levels of each the plurality of materials is set to correspond to a plurality of predetermined values.

14. A non-transitory processor-readable storage medium comprising machine-readable instructions that cause a processor to:

display on a graphical user interface (GUI) an equipment overview dashboard with selection options for materials that include at least one interchangeable material;

receive via the selection options on the equipment overview dashboard, user selection of the at least one material that is included in multiple equipment pieces;

access a plurality of data inputs that include failure data of the at least one user-selected material in a manufacturing facility having the multiple equipment pieces that include the at least one user-selected material, wherein the failure data includes at least details regarding incidents of failures and suspensions and wherein the suspensions include probable failures;

extract the details of the incidents of the failures and the suspensions from the failure data, wherein the details include at least fault words and at least one of the incidents includes a sequence of one or more of the failures and the suspensions;

generate and store on the non-transitory processor readable medium a fault ontology, wherein the fault ontology includes a hierarchical arrangement of a plurality of faults occurring in the multiple equipment pieces,
wherein the plurality of faults are classified into primary, secondary and tertiary fault modes, wherein each of the faults are identified by one or more of the fault words and combinations of nor word with the one or more fault words wherein each of the one or more fault words and each of the combinations are encoded with a unique pattern of fault number, level number and word number;

identify for the multiple equipment pieces via accessing the fault ontology, at least a subset of the one or more fault words and combinations of the nor word with the one or more fault words that are also included in the fault data via text matching;

determine the sequence of the one or more failures and the suspensions for the multiple equipment pieces based on the identification of the subset by matching the details of each of the incidents of failures and the suspensions from the failure data into corresponding ones of the primary, secondary and tertiary fault modes in the fault ontology via text matching;

feed the failure data to a code module;

build a model corresponding to the failure data from the code module that selects a best fit distribution for the multiple equipment pieces from a plurality of data distributions;

aggregate the models of the failure data of the multiple equipment pieces;

build a demand profile for the at least one user-selected material using the parameters of the aggregated models, wherein the demand profile provides an estimation of a future probability of failure of the at least one user-selected material in each equipment piece of the multiple equipment pieces that includes the at least one user-selected material wherein one or more of the failures and the suspensions of the at least user-selected one material in the equipment piece leads to a demand for the at least one user-selected material;

obtain an optimal inventory level to be maintained for the at least one user-selected material from the demand profile via measuring availability of the multiple equipment pieces that include the at least one user-selected material;

display on a simulation graphical user interface (GUI), a simulation based on the demand profile, the simulation showing iterative changes to inventory of the at least one user-selected material that make up one or more components of the multiple equipment pieces leading to the optimal inventory level; and output a maintenance schedule for the multiple equipment pieces that include the at least one material.

15. The non-transitory processor-readable storage medium of claim 14, further comprising instructions that cause the processor to:
collect the failure data of the at least one user-selected material, wherein the failure data includes at least a malfunction date, a type of failure, and time to failure.

16. The non-transitory processor-readable storage medium of claim 14, wherein the code module is an R-based code module.

* * * * *